US008566889B2

(12) United States Patent
Kure

(10) Patent No.: US 8,566,889 B2
(45) Date of Patent: Oct. 22, 2013

(54) CONTROL APPARATUS, CONTENT TRANSMISSION SYSTEM AND CONTENT TRANSMISSION METHOD

(75) Inventor: Yoshinobu Kure, Kanagawa (JP)

(73) Assignee: Sony Corporation (JP)

( * ) Notice: Subject to any disclaimer, the term of this patent is extended or adjusted under 35 U.S.C. 154(b) by 685 days.

(21) Appl. No.: 12/221,714

(22) Filed: Aug. 6, 2008

(65) Prior Publication Data

US 2009/0049489 A1    Feb. 19, 2009

(30) Foreign Application Priority Data

Aug. 14, 2007   (JP) ................................ P2007-211491

(51) Int. Cl.
*H04N 7/173*    (2011.01)
*H04N 7/18*     (2006.01)
*G06F 15/16*    (2006.01)

(52) U.S. Cl.
USPC ............... 725/95; 725/99; 725/100; 725/115; 725/116; 725/122; 379/114.03

(58) Field of Classification Search
None
See application file for complete search history.

(56) References Cited

U.S. PATENT DOCUMENTS

| 7,526,788 | B2 * | 4/2009 | Rodriguez ...................... 725/86 |
| 2003/0050973 | A1 * | 3/2003 | Tracton et al. ................. 709/203 |
| 2003/0061368 | A1 * | 3/2003 | Chaddha ........................ 709/231 |
| 2003/0187806 | A1 * | 10/2003 | Banerjee et al. .............. 705/400 |
| 2004/0249726 | A1 * | 12/2004 | Linehan ........................... 705/26 |
| 2006/0026665 | A1 | 2/2006 | Rodriguez et al. |
| 2007/0043829 | A1 * | 2/2007 | Dua ............................... 709/219 |
| 2007/0180485 | A1 * | 8/2007 | Dua ............................... 725/114 |
| 2008/0126109 | A1 | 5/2008 | Cragun et al. |
| 2010/0095334 | A1 * | 4/2010 | Shah-Nazaroff et al. ..... 725/100 |

FOREIGN PATENT DOCUMENTS

| JP |   08265722 A | 10/1996 |
| JP |   09046680 A |  2/1997 |
| JP | 2000-270309 A |  9/2000 |
| JP |   2001292436 A | 10/2001 |
| JP |   2002185940 A |  6/2002 |
| JP |   2003150483 A |  5/2003 |
| JP |   2005-051486 A |  2/2005 |

OTHER PUBLICATIONS

Office Action from Japanese Application No. 2007-211491, dated Jun. 5, 2012.

* cited by examiner

*Primary Examiner* — Vivek Srivastava
*Assistant Examiner* — Carmine Malangone
(74) *Attorney, Agent, or Firm* — Lerner, David, Littenberg, Krumholz & Mentlik, LLP

(57) ABSTRACT

Disclosed herein is a control apparatus for accepting a request for transmission of a content from a content transmission apparatus to the control apparatus and for passing on the request to the content transmission apparatus by way of a communication network allowing a transmission quality to be reserved and for issuing a request to a content accounting server to carry out a content accounting process according to the substance and content quality wherein the control apparatus: receives a specified substance and quality of the content and transmits a request to the content transmission apparatus to transmit the content; determines a transmission quality on the basis of the specified content quality and makes a reservation for the determined transmission quality of a transmission line on the basis of the transmission quality; and issues a request to a transmission-quality accounting server to carry out an accounting process according to the transmission quality.

7 Claims, 11 Drawing Sheets

FIG. 2

| CONTENT TITLE | CONTENT QUALITY | PHONE NUMBER | CONTENT RECIPIENT |
|---|---|---|---|
| A | a | 046-555-1111 | User1@bbb.example.com |
| | b | 046-555-1122 | |
| B | a | 046-555-2211 | |
| | b | 046-555-2222 | |
| ... | ... | ... | ... |

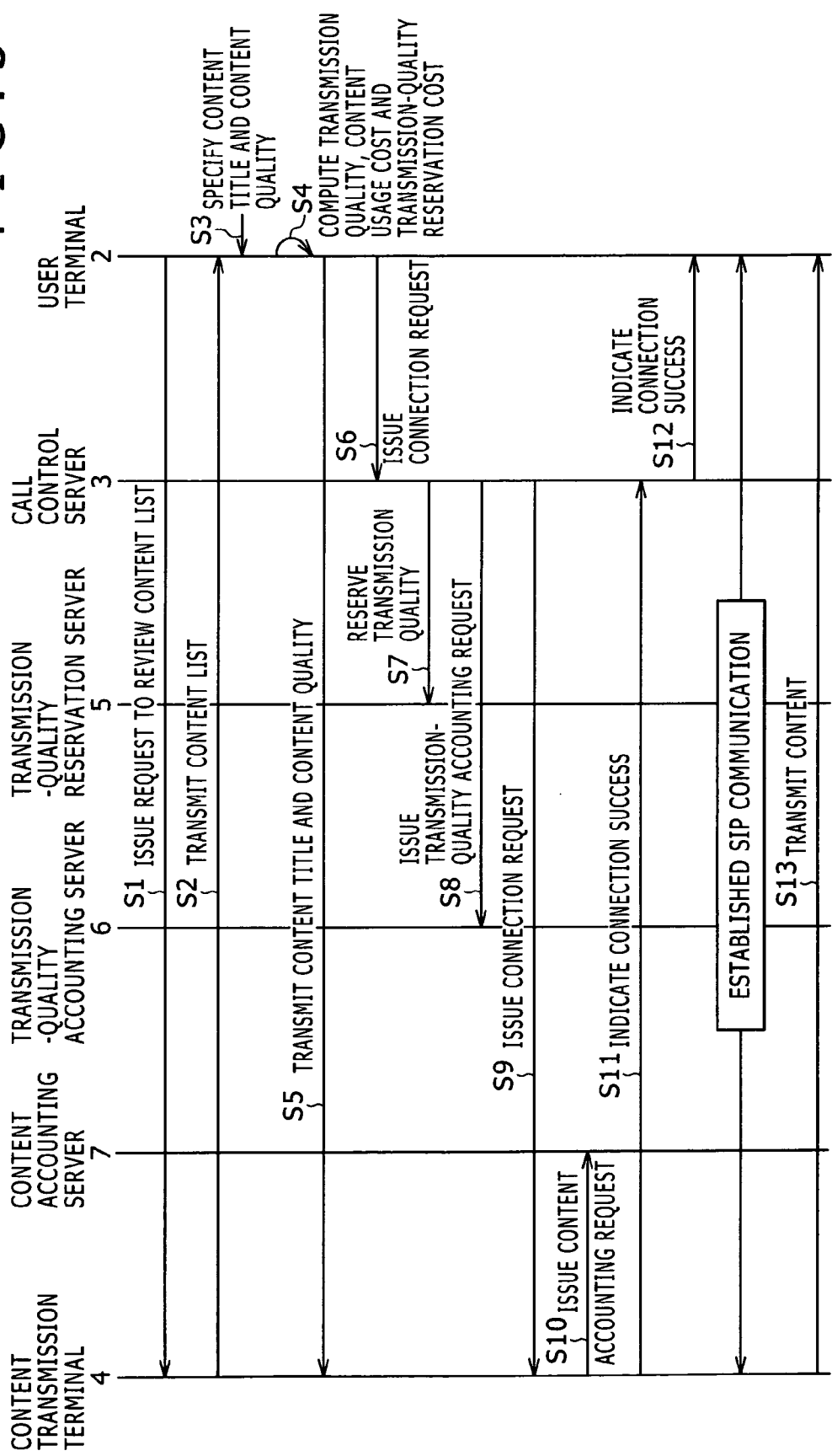

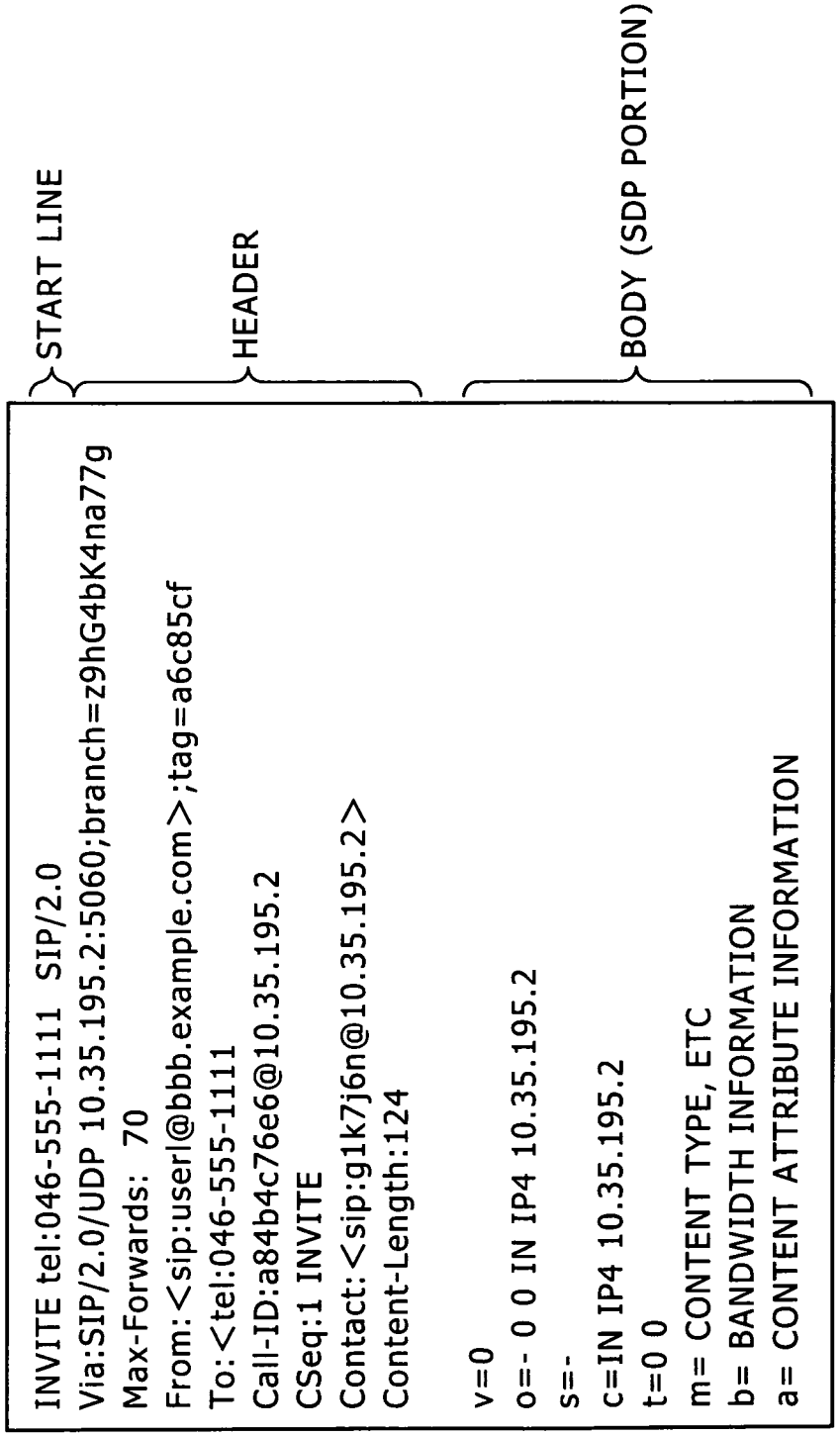

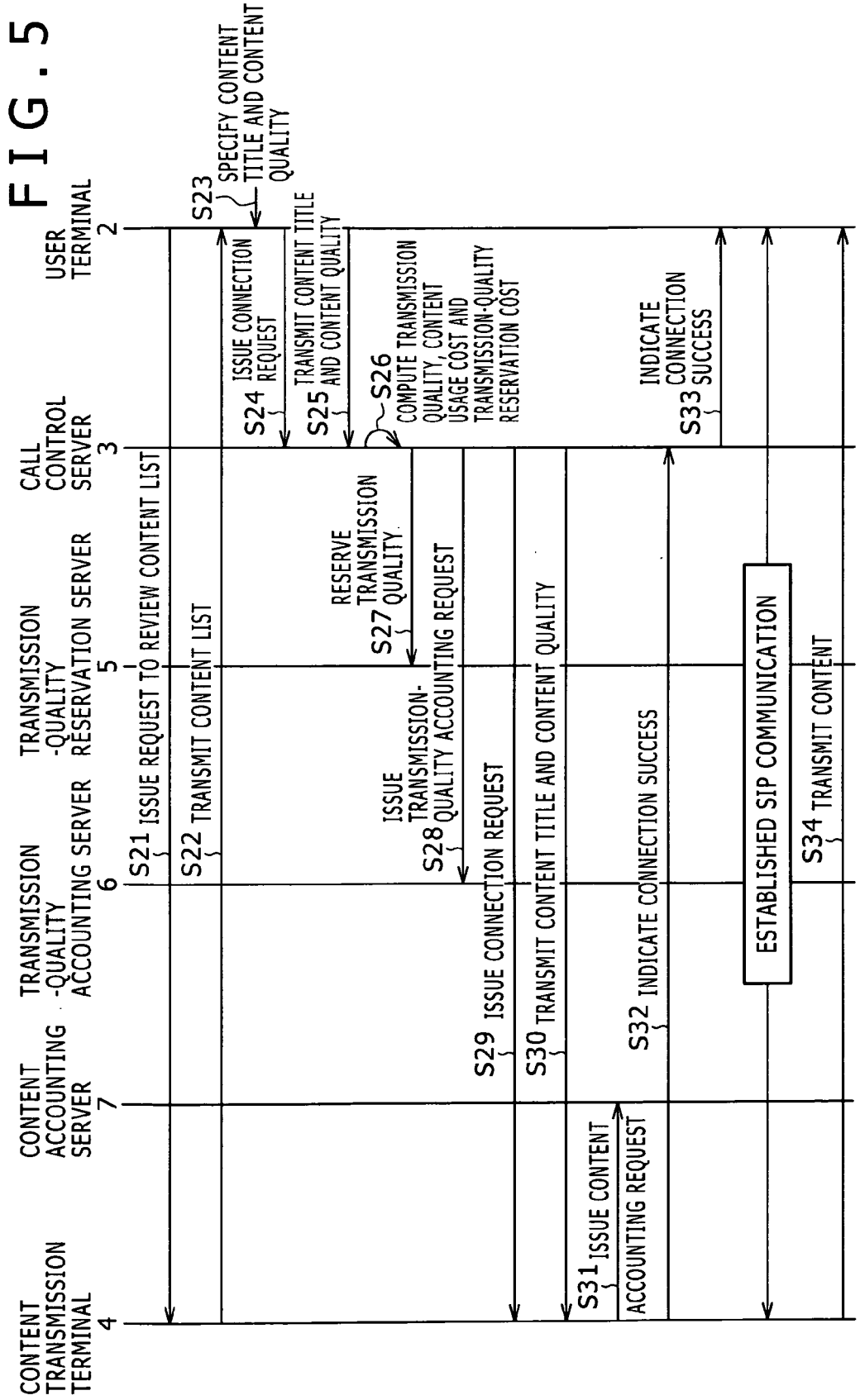

FIG. 6

```
INVITE tel:○○○-xxx-△△△△ SIP/2.0
Via:SIP/2.0/UDP 10.35.195.2:5060;branch=z9hG4bK4na77g
Max-Forwards: 70
From:<sip:user1@bbb.example.com>;tag=a6c85cf
To:<tel:○○○-xxx-△△△△
Call-ID:a84b4c76e6@10.35.195.2
CSeq:1 INVITE
Contact:<sip:g1k7j6n@10.35.195.2>
Content-Length:124 v=0
o=- 0 0 IN IP4 10.35.195.2
s=-
c=IN IP4 10.35.195.2
t=0 0
m= CONTENT TYPE, ETC
i= CONTENT TITLE, CONTENT QUALITY, ETC
b= BANDWIDTH INFORMATION
a= CONTENT ATTRIBUTE INFORMATION
```

- START LINE
- HEADER
- BODY (SDP PORTION)

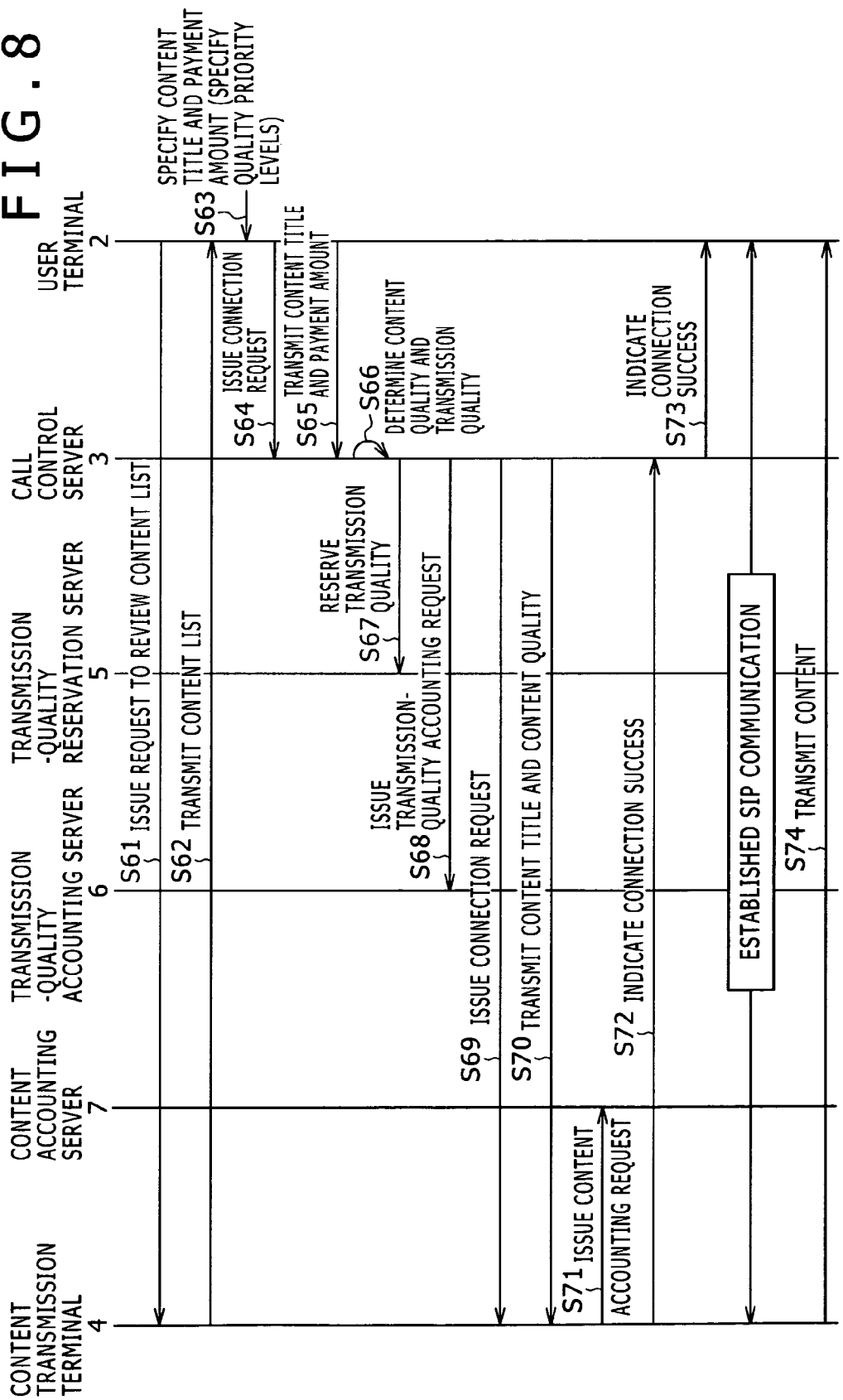

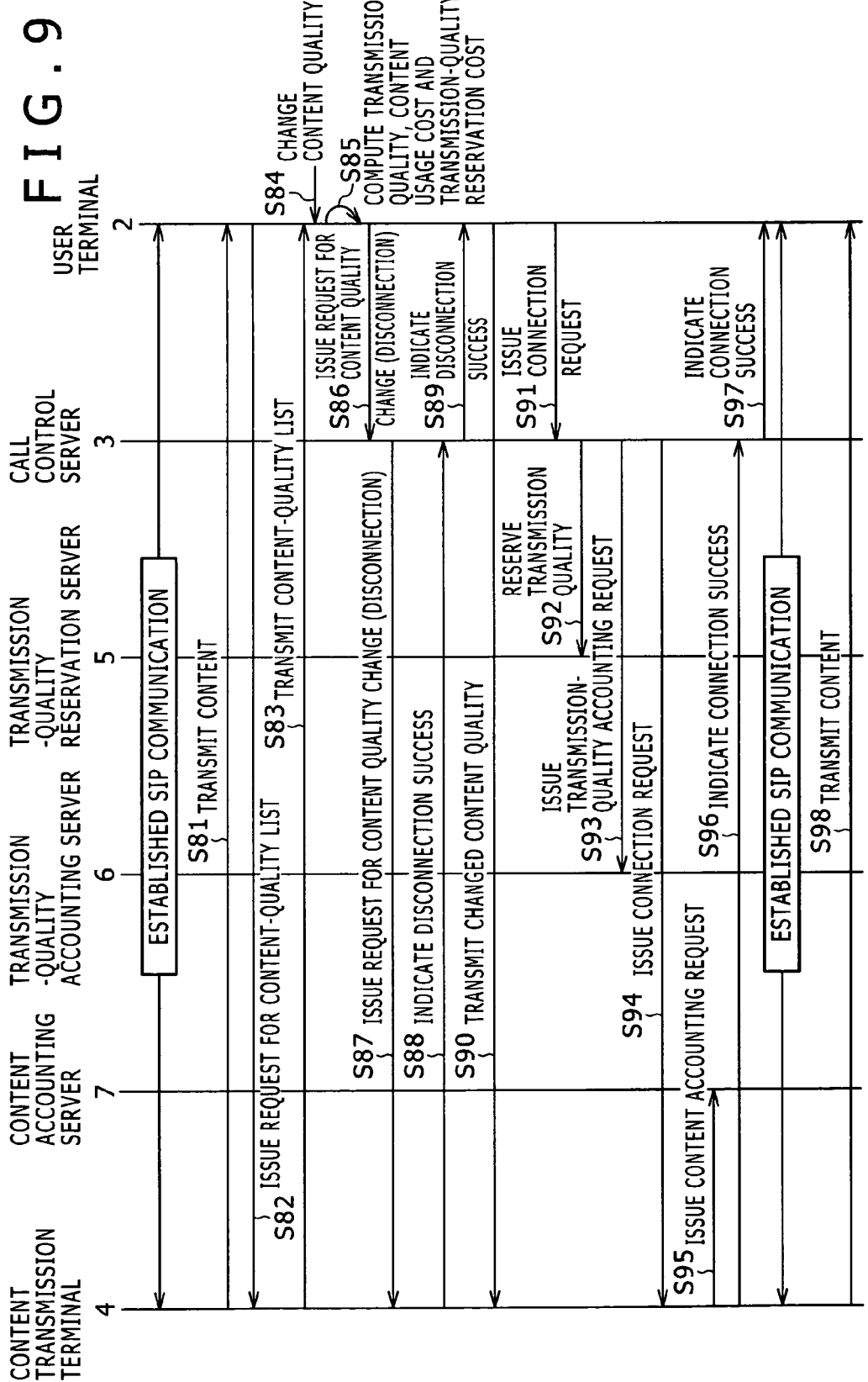

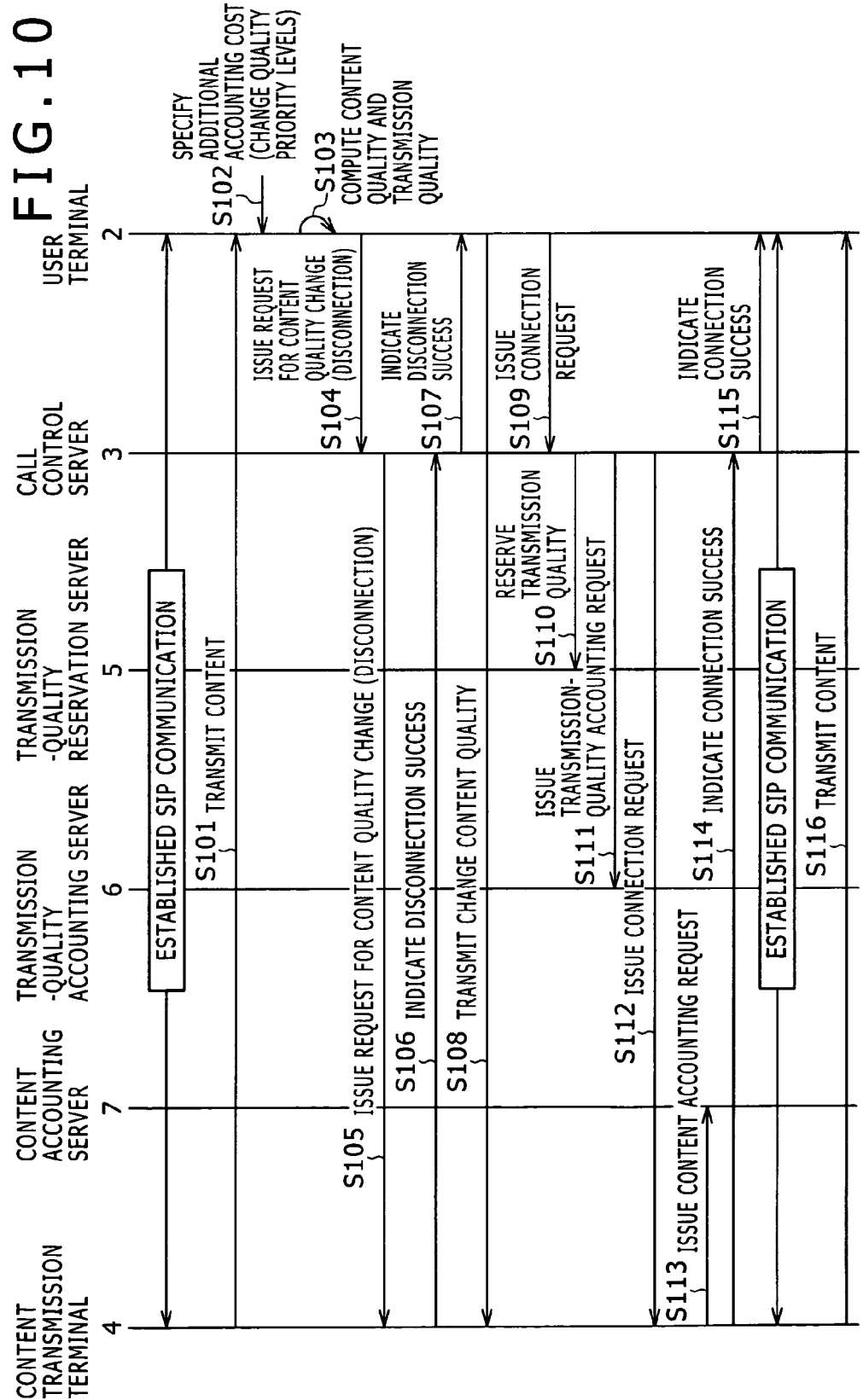

FIG.11

OUTGOING CALL NUMBER FORMAT: XXX-XXX-XXXX#ABC
[EXPLANATION OF PARAMETERS]
XXX-XXX-XXXX: PHONE-NUMBER FIELD
ABC         : AUXILIARY-NUMBER FIELD
A: QUALITY PARAMETER (1 TO 3)
B: RESOLUTION PARAMETER (1 TO 3)
C: FRAME RATE PARAMETER (1 TO 3)

FIG.12

OUTGOING CALL NUMBER FORMAT: XXX-XXX-XXXX#A
[EXPLANATION OF PARAMETERS]
XXX-XXX-XXXX: PHONE-NUMBER FIELD
A           : AUXILIARY-NUMBER FIELD
A: PAYMENT-AMOUNT PARAMETER (1 TO 3)
  1: 1000 YEN/HOUR
  2: 2000 YEN/HOUR
  3: 3000 YEN/HOUR

CONTROL APPARATUS, CONTENT TRANSMISSION SYSTEM AND CONTENT TRANSMISSION METHOD

CROSS-REFERENCE TO RELATED APPLICATIONS

The present application claims priority from Japanese Patent Application No. JP 2007-211491, filed in the Japanese Patent Office on Aug. 14, 2007, the entire content of which is incorporated herein by reference.

BACKGROUND OF THE INVENTION

1. Field of the Invention

The present invention relates to a control apparatus for carrying out processing such as a process of issuing a request to a content transmission apparatus as a request for a content to be transmitted from the content transmission apparatus to the control apparatus and a process of reserving the transmission quality of a transmission line required for transmitting the content from the content transmission apparatus to a content request originator operating the control apparatus in a communication network allowing the quality of transmission to be reserved. The present invention also relates to a content transmission system employing the control and content transmission apparatus connected to each other by the communication network and relates to a content transmission method adopted by the content transmission system.

2. Description of the Related Art

In a communication network such as the contemporary Internet, a user is allowed to select the quality of a content transmitted in a VOD (Video On Demand) service of the communication network whereas an accounting server is capable of carrying out an accounting process for the service. For example, Japanese Patent Laid-open No. 2000-270309 discloses a technology capable of collecting a cost proper for the quality of a pay streaming content actually listened to by the user in a service to distribute the content through a communication network.

In addition, in the communication network such as the contemporary Internet, a user is allowed to make a band reservation contract and pay a cost for the reserved band. For example, Japanese Patent Laid-open No. 2005-51486 discloses a technology capable of shortening a download time to any arbitrary value and setting the quality of an image being displayed in a streaming operation at any arbitrary value in a transaction carried out by content transmitting and receiving apparatus to purchase and sell or borrow and lend a band.

SUMMARY OF THE INVENTION

In the contemporary network, however, every time an application is activated, operations to reserve and release a band cannot be carried out frequently. Thus, an accounting process for reservation of a band cannot be carried out either. In addition, even though the quality of a content to be transmitted can be changed in accordance with a quality selection operation carried out by the user, a band for the content with the quality thereof changed cannot be reserved at the same time as the operation to change the quality.

Thus, there are accounting services provided for the operation to select the quality of a content and the operation to reserve a transmission quality such as a band as accounting services independent of the operations. However, there is no system for incorporating the accounting services, the operation to select the quality of a content and the operation to reserve the transmission quality in continuous processing.

Addressing the problem described above, inventors of the present invention provide a content transmission system capable of carrying out a process to select (determine) the quality of a content, a process to reserve a transmission quality of a communication network allowing a transmission quality to be reserved and an accounting process by incorporating the processes in continuous processing in a communication network allowing a transmission quality to be reserved on the basis of information received from the user as information on the substance of the content and the quality of the content. In the following description, the substance of a content means the title of the content.

In order to solve the problem described above, in accordance with a first embodiment of the present invention, there is provided a control apparatus for accepting a request for transmission of a content from a content transmission apparatus to the control apparatus and for passing on the request to the content transmission apparatus for transmitting the content to the control apparatus by way of a communication network allowing a transmission quality to be reserved and for issuing a request to a content accounting server having a function to carry out a content accounting process according to the substance and content quality of a content as a request for execution of a content accounting process for the content. The control apparatus: receives a specified substance of a content and a specified content quality of the content and transmits a request based on the specified substance and the specified content quality to the content transmission apparatus as a request for transmission of the content from the content transmission apparatus to the control apparatus; determines a transmission quality on the basis of the specified content quality and makes a reservation for the determined transmission quality of a transmission line between the content transmission apparatus and the control apparatus in conjunction with a transmission-quality reservation server, which is connected to the communication network, on the basis of the transmission quality; and issues a request to a transmission-quality accounting server having a function to carry out an accounting process according to a transmission quality as a request for execution of an accounting process for the reserved transmission quality.

In addition, in accordance with a second embodiment of the present invention, there is provided a content transmission system including: a content transmission apparatus to transmit a content requested by a content request originator to the content request originator by way of a communication network allowing a transmission quality to be reserved and to issue a request to a content accounting server having a function to carry out a content accounting process according to the substance and content quality of a content as a request for execution of a content accounting process for the requested content. The content transmission system further includes a call control server configured to carry out a process to establish a session between the content request originator and the content transmission apparatus, to make a reservation for a transmission quality of a transmission line between the content transmission apparatus and the content request originator in conjunction with a transmission-quality reservation server having a function to make a reservation for a transmission quality jointly with the call control server and to issue a request to a transmission-quality accounting server having a function to carry out an accounting process according to a transmission quality as a request for execution of an accounting process for the reserved transmission quality. In the content transmission system, the call control server: makes a reservation for a transmission quality of the transmission line on the basis of a transmission quality determined properly by the call control server or a user terminal for the content quality of the content requested by the content request originator; and issues a request to the transmission-quality accounting server as a request for execution of an accounting process for the reserved transmission quality.

In addition, in accordance with a third embodiment of the present invention, there is provided a content transmission method for transmitting a content requested by a content request originator to the content request originator by way of a communication network allowing a transmission quality to be reserved from a content transmission apparatus also used for issuing a request to a content accounting server having a function to carry out a content accounting process according to the substance and content quality of a content as a request for execution of a content accounting process for the requested content. The content transmission method includes the steps of: a control apparatus, which is operated by the content request originator in order to specify the substance and quality of the requested content, issuing a request based on the specified substance and specified quality of the requested content to the content transmission apparatus as a request for transmission of the requested content from the content transmission apparatus to the control apparatus; the control apparatus determining a transmission quality of a transmission line between the content transmission apparatus and the control apparatus on the basis of the specified content quality; the control apparatus making a reservation for the determined transmission quality of the transmission line in conjunction with a transmission-quality reservation server, which is connected to the communication network, on the basis of the transmission quality; and the control apparatus issuing a request to a transmission-quality accounting server having a function to carry out an accounting process according to a transmission quality as a request for execution of an accounting process for the reserved transmission quality.

In addition, in accordance with a fourth embodiment of the present invention, there is provided a control apparatus for accepting a request for transmission of a content from a content transmission apparatus to the control apparatus and for passing on the request to the content transmission apparatus for transmitting the content to the control apparatus by way of a communication network allowing a transmission quality to be reserved and for issuing a request to a content accounting server having a function to carry out a content accounting process according to the substance and content quality of a content as a request for execution of a content accounting process for the content. The control apparatus: receives a specified substance of a content and a specified payment amount for the content, determines an optimum content quality of the content as well as a transmission quality, which are in a range determined by the payment amount, and transmits a request based on the specified substance and the optimum content quality to the content transmission apparatus as a request for transmission of the content from the content transmission apparatus to the control apparatus; makes a reservation for the determined transmission quality of a transmission line between the content transmission apparatus and the control apparatus in conjunction with a transmission-quality reservation server, which is connected to the communication network, on the basis of the transmission quality; and issues a request to a transmission-quality accounting server having a function to carry out an accounting process according to a transmission quality as a request for execution of an accounting process for the reserved transmission quality.

In addition, in accordance with a fifth embodiment of the present invention, there is provided a content transmission system including: a content transmission apparatus to transmit a content requested by a content request originator to the content request originator by way of a communication network allowing a transmission quality to be reserved and to issue a request to a content accounting server having a function to carry out a content accounting process according to the substance and content quality of a content as a request for execution of a content accounting process for the requested content. The content transmission system further includes a call control server configured to carry out a process to establish a session between the content request originator and the content transmission apparatus, to make a reservation for a transmission quality of a transmission line between the content transmission apparatus and the content request originator in conjunction with a transmission-quality reservation server having a function to make a reservation for a transmission quality jointly with the call control server and to issue a request to a transmission-quality accounting server having a function to carry out an accounting process according to a transmission quality as a request for execution of an accounting process for the reserved transmission quality. In the content transmission system, the call control server: determines content and transmission qualities in a range determined by the payment amount specified by the content request originator as respectively an optimum content quality of the content, which has been requested by the content request originator as a content to be transmitted from the content transmission apparatus to the content request originator, and a transmission quality for the content on the basis of the content substance specified by the content request originator and the payment amount also specified by the content request originator; makes a reservation for a transmission quality of the transmission line on the basis of the determined transmission quality; and issues a request to the transmission-quality accounting server as a request for execution of an accounting process for the reserved transmission quality.

In addition, in accordance with a sixth embodiment of the present invention, there is provided a content transmission method for transmitting a content requested by a content request originator to the content request originator by way of a communication network allowing a transmission quality to be reserved from a content transmission apparatus also used for issuing a request to a content accounting server having a function to carry out a content accounting process according to the substance and content quality of a content as a request for execution of a content accounting process for the requested content. The content transmission method includes the steps of: a control apparatus, which is operated by the content request originator in order to specify the substance of the requested content and a payment amount for the requested content, determining content and transmission qualities in a range determined by the payment amount specified by the content request originator as respectively an optimum content quality of the content, which has been requested by the content request originator as a content to be transmitted from the content transmission apparatus to the content request originator, and a transmission quality for the content on the basis of the content substance specified by the content request originator and the specified payment amount; the control apparatus issuing a request based on the specified substance and the determined optimum content quality to the content transmission apparatus as a request for transmission of the requested content from the content transmission apparatus to the control apparatus; the control apparatus making a reservation for the determined transmission quality of a transmission line between the content transmission apparatus and the control apparatus in conjunction with a transmission-quality reservation server, which is connected to the communication network, on the basis of the determined transmission quality; and the control apparatus issuing a request to the transmission-quality accounting server as a request for execution of an accounting process for the reserved transmission quality.

In accordance with the present invention, the user merely specifies the substance of a desired content and either a quality of the content or a payment amount for the content by entering information on the specified content and the specified quality or payment amount to a control apparatus, which then determines a transmission quality of the content and optimum content qualities of the content if a payment amount for the content is specified in place of a content quality. Requiring the user to merely specify a content and either a quality of the content or a payment amount for the content in this way, the control server automatically makes a reservation for a transmission quality determined (or computed) for a transmission line so that the user can acquire the desired content with a quality assured to be the content quality specified by the user or a quality in a range determined by the payment amount specified by the user. In addition, since accounting processes for the content and the transmission quality are also completed as well, efficient processing can be carried out. Thus, a user-friendly service can be rendered to the user without requiring the user to carry out cumbersome operations.

BRIEF DESCRIPTION OF THE DRAWINGS

These and other objects and features of the present invention will become clear from the following description of preferred embodiments given with reference to the accompanying drawings, in which:

FIG. 2 is an explanatory diagram showing a typical content list according to the first embodiment of the present invention;

FIG. 3 is a diagram showing a typical content transmission processing sequence according to the first embodiment of the present invention;

FIG. 4 is an explanatory diagram showing a typical INVITE message according to the first embodiment of the present invention;

FIG. 5 is a diagram showing a typical content transmission processing sequence according to another version of the first embodiment of the present invention;

FIG. 6 is an explanatory diagram showing a typical INVITE message according to the other version of the first embodiment of the present invention;

FIG. 8 is a diagram showing a typical content transmission processing sequence according to another version of the second embodiment of the present invention;

FIG. 9 is a diagram showing a typical content transmission processing sequence according to a third embodiment of the present invention;

FIG. 10 is a diagram showing a typical content transmission processing sequence according to a fourth embodiment of the present invention;

FIG. 11 is a typical format of a TEL URI (Uniform Resource Identifier) used for specifying the title and quality of a desired content in accordance with a fifth embodiment of the present invention; and FIG. 12 is a typical format of a TEL URI used for specifying the title of a desired content and a payment amount for the content in accordance with the fifth embodiment of the present invention.

DETAILED DESCRIPTION OF THE PREFERRED EMBODIMENTS

Embodiments of the present invention are explained by referring to diagrams as follows. The present invention relates to a control apparatus and a content transmission system which incorporate four processes in continuous processing in accordance with either of a content quality and a payment amount, which are specified by the user for a content desired by the user, in transmission of the content such as a video or audio content from a content transmission apparatus to a content request originator operated by the user by way of a communication network allowing a transmission quality to be reserved. The four processes are (1) a content-quality recognizing/determining process, (2) a transmission-quality determining/reserving process, (3) a content accounting process and (4) a transmission-quality accounting process. An example of the communication network allowing a transmission quality to be reserved is an NGN (Next-Generation Network). The type of the content to be transmitted from the content transmission apparatus to the content request originator includes information indicating whether the content is video or audio data. In the case of video data, the content can be a moving or still picture. The content can be transmitted to the content request originator in a format such as a stream or file format.

Since each of the embodiments described below is no more than a preferred typical implementation of the present invention, each of the embodiments imposes a variety of technologically desirable restrictions on the present invention. It is to be noted that, however, the scope of the present invention is by no means limited to the embodiments explained in the following description as long as the description does not specially limit the present invention or unless the description specially limits the present invention. For example, information such as processing times, processing orders and numerical conditions in the following description is no more than preferred typical examples. In addition, relations between locations, parameter names and other information, which are shown in the diagrams referred to in the following description, are approximate.

Figure 1:
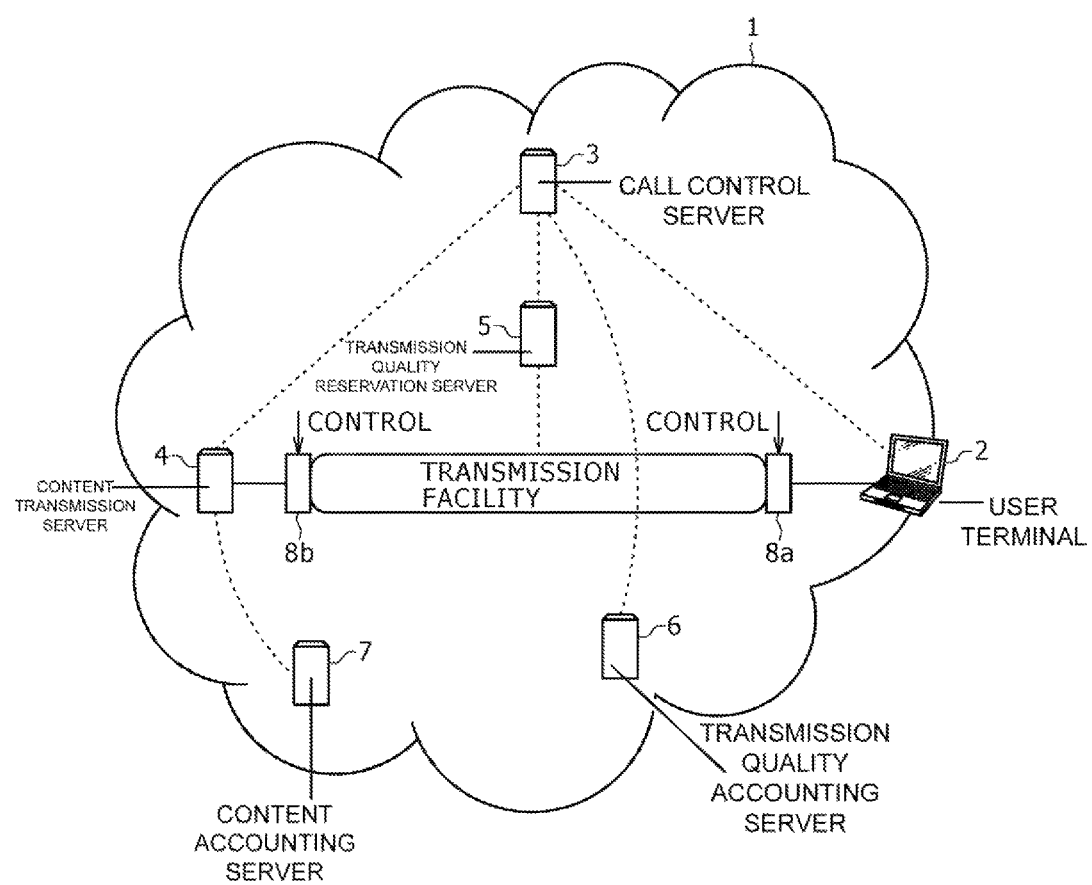
FIG. 1 is an explanatory diagram showing a typical configuration of a content transmission system according to a first embodiment of the present invention.

First of all, by referring to FIGS. 1 and 2, the following description explains a typical configuration of a content transmission system to which the embodiments can be applied.

FIG. 1 is an explanatory diagram showing a typical configuration of a content transmission system including a call control server 3 having a function to incorporate processes (1) to (4) described above in continuous processing by making use of the NGN 1 allowing a transmission quality to be reserved. As shown in FIG. 1, the NGN 1 includes a user terminal (also referred to as a content request originator mentioned so far) 2, a call control server 3, a content transmission terminal (also referred to as a content transmission apparatus cited so far) 4, a transmission-quality reservation server 5, a transmission-quality accounting server 6 and a content accounting server 7. The call control server 3 and the user terminal 2 serve as the control apparatus explained earlier.

The NGN 1 is a communication network capable of executing control based on an SIP (Session Initiation Protocol). In general, an NGN is an IP communication network obtained by integrating the present IP network for rendering Internet services and the present telephone network constructed separately from the IP network as a telephone network for providing telephone services. The NGN is a result of network integration carried out by making use of IP technologies in order to improve the QoS (quality of services) and communication security. The NGN is thus a next-generation IP network for replacing the present public network. Activities are also being carried out in an attempt to present not only telephone services but also TV broadcasts by making use of a common IP network. At the present time, the ITU-T (International Telecommunication Union Telecommunication Standardization Section) and others function as a central standardization body for standardizing the NGN. Also in Japan, communication corporations intensify activities aimed at the standardization of the NGN. Some of the communication corporations have already implemented field and trial operations of the NGN.

In a Y.2001 recommendation made by the ITU-T, a variety of characteristics which the NGN should have are prescribed. First of all, the important one of the characteristics is presentation of end-to-end QoS assurance. In the NGN, a large number of access networks, a large number of mobile phones and terminals and a large number of applications are used. Examples of the access networks are xDSL and WiFi (Wireless Fidelity) networks. Examples of the terminals are telephones, PCs, information electrical appliances and information home electronics. In such a communication environment, a terminal is capable of negotiating a QoS with the communication network and presenting the QoS to an application at the upper level. A next important one of the characteristics is support of mobility. The NGN is required to render the following communication services. By carrying only one PC, the user should be capable of communicating with others through a variety of access networks such as the xDSL network inside a home, the WiFi network used as an outdoor network and a FTTH (Fiber To The Home) network at an office. In addition, the user should be capable of communicating with others by making use of a number of PCs while moving from one place to another in an office, during a business trip or at another time requiring such a communication. In addition, the Y.2001 recommendation made by the ITU-T also prescribes separation of the transfer function of the communication network and the control function of the communication network from each other, support for a variety of accesses, FMC (Fixed Mobile Convergence) of converging a stationary network with a mobile network, urgent communications and applications to control of legal wiretappings to mention a few. However, these are not described in this patent specification in detail.

From a technical aspect, incorporation of the NGN standardization by the ITU-T with standardizations by other standardization bodies is deemed important. For example, an IMS (IP Multimedia Subsystem), which is a significant configuration element of the NGN, is a subsystem developed by the 3GPP. The 3GPP is a standardization body established for the third-generation mobile phone. The IMS adopts the SIP and many other protocols. The SIP and many other protocols are protocols developed by the IEFT (Internet Engineering Task Force).

The IMS used in the standardization of the NGN is a communication system for rendering multimedia services. This communication system is a system obtained as a result of integrating public communication services by making use of IP technologies and the SIP serving as a protocol for Internet phone services. The public communication services have been rendered by making use of different circuit and packet switches employed so far in networks such as stationary telephone networks and mobile communication networks.

Roles played by the IMS and functions of the IMS are explained as follows. The first role/function of the IMS is a role/function to provide support for establishment of a multimedia session. A technology for establishing an end-to-end communication between multimedia terminals is a technology for controlling a multimedia session. On the basis of a protocol for controlling a session, the IMS makes use of an IP transmission network as a propagation network, presenting multimedia sessions between an IP transmission network or its own IP network and another IP network as well as between another IMS network and a PSTN network (which is a stationary phone network). An example of the protocol for controlling a session is the SIP which is defined by the IETF.

The second role/function of the IMS is a function to sustain a fixed transmission quality and assure/implement a communication, for which a required transmission band has been secured, in an end-to-end communication. This second role/function is a QoS control function. In accordance with the condition of a contract made in conjunction with the transceiver terminal used by the user and in accordance with the communication type indicating that the transmitted content is an audio content, a video content, data or another kind of information, the IMS controls network nodes in an IP packet transmission network, specifies a quality class and secures a necessary band prior to establishment of a communication.

The third role/function of the IMS is a function to support interworks (that is, collaborating operations) in an IP (packet) network and a line exchange network. The IMS renders not only IP-based multimedia services to terminals such as mobile phones and radio LAN (Local Area communication Network) terminals independently of the access network, but also services provided by connecting these terminals to the already existing telephone network and/or another IP packet transmission network.

In addition, the IMS also has a role/function to provide various kinds of support such as roaming support, support for quick creation of an application service and new support for an access from a communication network other than a GPRS (General Packet Radio Service) network.

It is to be noted that protocols for indicating a transmission band of a communication network other than the IMS network include a protocol known as a diameter protocol and an RSVP (resource reservation protocol) used for improving the QoS in the IP network in related art.

Used for establishing a session, on the other hand, the SIP provides a communication-partner identifying function as well as call-receiving, call-transmitting and line-breaking functions. The SIP expresses a message, which is communicated data, in a text format. A system making use of the SIP has a configuration including large elements, that is, user agents and SIP servers. Each of the user agents is an SIP terminal such as a PC having an IP phone function. Each user agent can be configured to serve as a user-agent client or a user-agent server. The user-agent client has a function to transmit a request to the user-agent server whereas the user-agent server has a function to respond to a request received from the user-agent client. In the typical content transmission system shown in FIG. 1, the user terminal 2 functions as a user-agent client whereas the content transmission terminal 4 serves as the user-agent server.

The SIP server is a generic name given to a proxy server, a redirect server, a registrar and a location server. The functions of each of these servers are explained as follows.

The proxy server is a server for relaying an SIP request from a user-agent client to a next server. The proxy server has functions such as an authentication function, a permission function, a function to control network accesses, a routing function, a function to transmit an SIP request and a function to assure security.

The redirect server has a function to receive a request from a user-agent client on the request originating side and a function to notify the user-agent client on the request originating side of the present address of a user agent on the request receiving side. The user-agent client on the request originating side retransmits the request to an address received from the redirect server as the present address of a user agent on the request receiving side. Unlike the proxy server, the redirect server does not transfer an SIP request.

The registrar is a server for receiving a request (strictly speaking, a registration request) for registering the present position of a user-agent client. The registrar normally operates on the same host computer as the proxy server and the redirect server.

The location server is a server for keeping registration information received from the registrar and responding to a request received from the redirect server or the proxy server as a request for reference to an incoming URI (Uniform Resource Identifier). The location server can be installed at the same location as the SIP server.

It is not always necessary to implement the functions of the servers described above in one host computer. It is also not always necessary to install these servers at the same location. In the typical system shown in FIG. 1, these servers are collectively implemented as the call control server 3.

It is to be noted that a server for controlling sessions (that is, connections) by adoption of the SIP in an IP network is referred to as an SIP server. On the other hand, the function of a server for controlling sessions (that is, connections) by adoption of the SIP in the IMS is referred to as a CSCF (Call Session Control Function). In accordance with the role played by this server in the communication network, the server provides three different functions of the CSCF. That is to say, the CSCF is classified into the three different functions, i.e., a P-CSCF (Proxy—Call Session Control Function), an I-CSCF (Interrogating—Call Session Control Function) and an S-CSCF (Serving—Call Session Control Function).

The SIP described above is a protocol obtained from research and development which are carried out to produce a technology necessary for integrating a phone network in an IP network. Thus, as an important function of the SIP system, there is ENUM (E.164 Number Mapping) allowing the conventional phone numbers to be used in a variety of IP network applications such as, mainly, IP phones.

The standardization of the ENUM is a work carried out jointly by the IETF and the ITU-T. A process to incorporate the ENUM with the SIP entails a process carried out by the user terminal 2 and the content transmission terminal 4, which each serve as an SIP terminal, to search the ENUM and a process carried out by the call control server 3 functioning as an SIP server to search the ENUM.

The ENUM adopts a technology for associating a phone number with an address network and a service in the communication network in order to serve as a technology used in access means. To put it in detail, a phone number is associated with an address network and a service in the communication network by associating a phone-number system set forth by the ITU-T (International Telecommunication Union Telecommunication Standardization Section) with a special domain area by making use of a DNS (Domain Name System). The phone-number system set forth by the ITU-T is a system of internationally unique phone numbers and is known as the E164 whereas the special domain area is a sub-domain of .e164.arpa. A plurality of network addresses can be associated with a phone number. For example, by associating the phone number of a user with the electric-mail address of the user, a FAX number of the user and the URL of a web site of the user by making use of the ENUM, the phone number can be used as a uniform identification number of means for making an access to the user. Let us take a phone number 03-1234-5678 as an example. In this case, the leading number 0 is replaced with the country number of 81 assigned to Japan, and an ENUM domain name (referred to as the E164 number) is obtained by rearranging the phone number in the opposite direction and appending a string of 'e164.arpa' to the rearranged phone number to give 8.7.6.5.4.3.2.1.3.1.8.e164.arpa. The address and other information which correspond to this DNS record are saved in the user terminal 2, the content transmission terminal 4 or the call control server 3.

By executing such an ENUM function, the user is capable of utilizing a variety of IP network applications by making use of the conventional phone number without being aware of details of the association of the phone number with an address network and a service in the communication network.

The reader is requested to refer back to the typical system configuration shown in FIG. 1. The user terminal 2 is a terminal employing a computer capable of carrying out processing to input and output information by way of a GUI (Graphical User Interface). The user terminal 2 also carries out a process to issue a request to the content transmission terminal 4 directly or by way of the call control server 3 as a request for transmission of a content selected by the user from the content transmission terminal 4 to the user terminal 2. The user terminal 2 receives the requested content from the content transmission terminal 4 which transmits the content to the user terminal 2 through a transfer facility of the NGN 1. Thus, the user terminal 2 needs to be merely an apparatus capable of receiving a service defined by the content transmission terminal 4. Examples of the user terminal 2 are a personal computer, a mobile phone, a game machine and a TV conference system.

The call control server 3 has the functions making use of an SIP (Session Initiation Protocol) server described previously. The call control server 3 carries out processing such as a process to establish a session between the user terminal 2 and the content transmission terminal 4, a process to make a reservation of a transmission quality such as a band in conjunction with the transmission-quality reservation server 5 and a process to request the transmission-quality accounting server 6 to perform an accounting process for a reserved transmission quality.

The content transmission terminal 4 is a typical content transmission apparatus. The content transmission terminal 4 has a storage section used for storing contents and transmits a specific one of the contents to the user terminal 2 in accordance with a request issued by the user terminal 2 to the content transmission terminal 4 directly or by way of the call control server 3. The storage section employed in the content transmission terminal 4 is shown in none of the figures. The storage section is also used for storing a content list typically like one shown in FIG. 2. As shown in the figure, the list of contents shows relations between content substances (each also referred to as a content title), content qualities and telephone numbers (each referred to as a TEL URI (Uniform Resource Identifier)). The phone number is a phone number selected by the user in order to specify a desired content from the content list transmitted by the content transmission terminal 4 to the user terminal 2. The content transmission terminal 4 receives the phone number selected by the content request originator as a phone number representing the title and quality of the desired content and, on the basis of the phone number, refers to the list of contents in order to determine the title and quality of a content desired by the content request originator. Then, the content transmission terminal 4 transmits the content to the user terminal 2. Thus, in accordance with just a download operation carried out by the content request originator, that is, in response to a phone number received from the content request originator, the content transmission terminal 4 transmits a content requested by the content request originator to the user terminal 2. The content transmission terminal 4 also records information on the content request originator on the list as a content recipient by associating the information with the title of the content. Then, the content transmission terminal 4 transmits the title of the content transmitted to the user terminal 2, the quality of the content and the information on the content request originator to the content accounting server 7, requesting the content accounting server 7 to carry out an accounting process for the content. It is to be noted that, as described above, each of the electronic-mail addresses registered in the typical content table shown in FIG. 2 is a SIP URI corresponding to the TEL URI. A SIP URI can be used in place of the TEL URI in a process to transmit a requested content from the content transmission terminal 4 to the user terminal 2 requesting the content and an accounting process carried out by the content accounting server 7 for the content.

The content transmission terminal 4 is typically one of a media distribution server, a TV conference system and the like, which are used for rendering VOD (Voice On Demand) services, IPTV (Internet Protocol Television) services and live video distribution services.

In accordance with a command received from the call control server 3, the transmission-quality reservation server 5 receives a request for a reservation for a transmission quality of a requested content, that is, a reservation for a communication network resource to be allocated to the requested content and determines whether or not the transmission quality can be assured. For example, as the transmission-quality reservation server 5, an RACF (Resource Admission Control Function) server is conceivable. If the transmission-quality reservation server 5 determines that the reserved transmission quality can be assured, the transmission-quality reservation server 5 notifies the call control server 3 that the request for the reservation for the transmission quality has been accepted by the transmission-quality reservation server 5. At the same time, the transmission-quality reservation server 5 requests a QoS PE-FEs (Policy Enforcement Function Element) of the transfer facility to carry out processing such as a process to secure a transmission quality necessary for transmission of the content as a transmission quality on the side of a transmission line and a process to execute inflowing control. Normally, the PF-FEs are implemented as an ABG-FE (Access Border Gateway Function Element) and/or an IBG-FE (Interconnection Border Gateway Function Element) which exist at the edges 8a and 8b of the transmission line.

In accordance with a command received from the call control server 3, the transmission-quality accounting server 6 carries out an accounting process for the transmission quality reserved for the content. The accounting process is carried out typically on the basis of information such as the terminal for which the transmission quality has been reserved, the reservation time period and the transmission band.

The content accounting server 7 is a server for carrying out an accounting process for the content title indicating the content and the quality of the content.

The accounting process (also referred to as a settlement process) can be carried out by each of the transmission-quality accounting server 6 and the content accounting server 7 by adoption of an existing method. For example, costs based on accounting data for the reserved transmission quality and accounting data for the acquisition of the content are each deducted together with the regular communication cost from a bank account opened for the user or the person acquiring the content in a bank or the like. As an alternative, the costs based on accounting data for the reserved transmission quality and accounting data for the acquisition of the content are deducted from a bank account opened separately from a bank account for the regular communication cost in an online banking transaction. As another alternative, the costs based on accounting data for the reserved transmission quality and accounting data for the acquisition of the content as well as the regular communication cost can be paid by transfers of money through a bank in a settlement process.

In an operation to transmit a content from the content transmission terminal 4 to a content request originator by way of the NGN 1 in accordance with the present invention, processes (1) to (4) described above can be conceivably carried out by the user terminal 2, the call control server 3, another server and/or another terminal or a plurality of other servers and/or other terminals as distributed processing. Conceivable configurations in which processes (1) to (4) are carried out by the user terminal 2, the call control server 3, another server and/or another terminal or a plurality of other servers and/or other terminals as distributed processing are all configurations according to the present invention.

First Embodiment

By referring to FIGS. 3 and 4, the following description explains a typical case in which (1) the content-quality determining process, (2) the transmission-quality determining/reserving process, (3) the content accounting process and (4) the transmission-quality accounting process are carried out by the user terminal 2 and the call control server 3 as distributed processing, in an operation to transmit a content from the content transmission terminal 4 to a content request originator by way of the NGN 1 in accordance with the content quality requested by the user.

FIG. 3 is a diagram showing a typical content transmission processing sequence for a case in which each of the user terminal 2 and the call control server 3 has functions of a control apparatus, and the user terminal 2 and the call control server 3 incorporate processes (1) to (4) described above as continuous processing. In this typical content transmission processing sequence, as the user terminal 2, an http server such as the so-called portal site is started up by the content transmission terminal 4 or another server and enabled to communicate with the content transmission terminal 4 as well as the call control server 3. The SIP is adopted only for establishing a session for a data transmission such as a streaming. In this typical content transmission processing sequence, the user terminal 2 transmits the title and a quality of a content desired by the user to the content transmission terminal 4 by adoption of another protocol such as the http in place of the SIP.

In the processing sequence shown in FIG. 3, first of all, at a step S1, the user terminal 2 is connected to the content transmission terminal 4 directly or by way of the NGN 1, which is an IP-based network, and issues a request to review a list of contents through a web browser, that is, by making use of the http or the like. The request to review a list of contents also indicates a request for transmission of a content list which includes information such as content titles, content qualities and content prices. Then, at the next step S2, the content transmission terminal 4 transmits the requested list of contents to the user terminal 2. The content list with a format shown in FIG. 2 is a typical list of contents. The list of contents can have a variety of other conceivable formats such as a thumbnail display format or a viewable/audible format.

Then, at the next step S3, the user makes use of the web browser to verify the content list received by the user terminal 2 from the content transmission terminal 4. Subsequently, the user specifies the title and quality of a content, the transmission of which is desired by the user, by clicking a mouse or the like.

Then, at the next step S4, the user terminal 2 computes a transmission quality of a transmission line between the content transmission terminal 4 and the user terminal 2, a content usage cost and a transmission-quality reservation cost on the basis of the specified content title and specified quality of the content. The transmission line is a transmission line necessary for transmitting the content from the content transmission terminal 4 to the user terminal 2. It is nice to display the transmission quality, the content usage cost and the transmission-quality reservation cost, which have been computed by the user terminal 2, on a display unit or a monitor screen so that the user can verify them.

It is to be noted that parameters of the content quality include a resolution, a frame rate, an image quality (or an SN ratio), a codec, a transmission rate, a sampling frequency and an audio channel number. On the other hand, parameters of a transmission quality to be reserved later include a transmission bandwidth, a permissible delay, a priority level, a permissible jitter quality and a band assurance priority level.

Then, at the next step S5, the user terminal 2 transmits information on the title and quality of the content to the content transmission terminal 4 by making use of the web browser through the http or the like, requesting the content transmission terminal 4 to transmit the content to the user terminal 2. Subsequently, at the next step S6, the user terminal 2 issues a request for a connection (or a request to transmit an outgoing call) in accordance with the SIP to the call control server 3. When issuing the request, information on the transmission quality is also transmitted to the call control server 3 at the same time.

As described above, in the NGN 1, the SIP is used for establishing a session between user agents such as between the user terminal 2 and the content transmission terminal 4. In the SIP used for establishing a session, a message having a text format is exchanged between the user agents. That is to say, communicated data is exchanged between the user terminal 2 and the content transmission terminal 4. In the connection request of the step S6 shown in FIG. 3, the user terminal 2 transmits a connection request message referred to as an INVITE request like one shown in FIG. 4 to the call control server 3. The INVITE request is a request for establishment of a session with a partner terminal. The message of the INVITE request includes various kinds of numerical data necessary for establishing the session.

As shown in FIG. 4, the SIP message is large, being divided into a start line, a header and a body. The start line is a line provided at the beginning of the SIP message. The start line shows the name of a method indicating the objective of the SIP message. In addition, the start line also includes a request URI showing a recipient to receive the SIP message. Since the SIP message shown in FIG. 4 is a connection request message, the name of the method is INVITE. In addition, the request URI can be a SIP URI in place of a TEL URI. The method name such as INVITE indicates what kind of control is requested by the SIP message serving as a connection request message. The name of a method conforms to one of specifications such as RFC3261, RFC2976 and RFC3311.

The header describes details of the control substance of the SIP message. The header includes a plurality of header lines each having a meaning prescribed in advance. A URI described on a 'To' line in the header shows the recipient of the request message whereas a URI described on a 'From' line in the header shows the originator of the request message. In the typical SIP message shown in FIG. 4, the URI described on the 'To' line in the header is a TEL URI. It is to be noted, however, that each of the URIS described on the 'To' and 'From' lines in the header is normally a SIP URI.

The body is data conveyed by the SIP message. In the case of this typical SIP message, the body is information described in an SDP (Session Description Protocol) format as information on media to be used in opening the session. By classifying records described in the SDP format into types including a session description, a time description and a media description, the contents and format of each record can be determined.

For example, an m line in the body indicates information such as the type of the content (media), a port number, a transport/protocol and a format. A b line shows transmission-quality information such as information on a bandwidth. An a line shows information on an attribute of the content (or the media). An example of the attribute is the codec. Other lines include an i line not shown in the figure. Since the i line is a line allocated to any relatively free description, the i line can be used for describing a content quality or a transmission quality. In the case of this embodiment, however, a SIP URI or a TEL URI unique to the content title and the content quality is provided so that the URI can be used for identifying the content title and the content quality.

At the next step S7 after the processing carried out at the step S6, the call control server 3 makes a reservation for the transmission quality received from the user terminal 2 in conjunction with the transmission-quality reservation server 5 on the basis of the transmission quality. In making the reservation, the transmission-quality reservation server 5 issues a command to secure the reserved transmission quality to the transmission facility in the NGN 1.

Then, at the next step S8, the call control server 3 issues a transmission-quality accounting request to the transmission-quality accounting server 6 in order to request the transmission-quality accounting server 6 to carry out an accounting process for the reserved transmission quality. At this request, the transmission-quality accounting server 6 carries out the accounting process.

Then, at the next step S9, the call control server 3 passes on the connection request message (or the INVITE request) received from the user terminal 2 to the content transmission terminal 4. The connection request message may include information on the quality of the content.

Receiving the connection request message from the call control server 3, at the next step S10, the content transmission terminal 4 issues a content accounting request to the content accounting server 7 in order to request the content accounting server 7 to carry out an accounting process for the transmitted content. At this request, the content accounting server 7 carries out the accounting process.

Then, at the next step S11, the content transmission terminal 4 transmits a response indicating a connection success to the call control server 3. The response indicates that a connection between the content transmission terminal 4 and the user terminal 2 has been established successfully in accordance with the connection request message (or the INVITE request) received from the call control server 3. An example of the response is a message showing a method name of '200 OK.' Then, at the next step S12, the call control server 3 passes on the response received from the content transmission terminal 4 to the user terminal 2. Receiving the response indicating a connection success from the content transmission terminal 4 through the call control server 3, the user terminal 2 transmits a message having a method name of ACK to the content transmission terminal 4 in order to indicate that a session of an SIP communication has been established. It is to be noted that in the processing sequence described above, messages having method names of '100 Trying' and '180 Ringing' are generally also exchanged. However, processes to exchange these messages are not described.

Then, at the next step S13, the content transmission terminal 4 starts transmission of the content to the user terminal 2 through the transmission facility. Since the transmission facility has secured the transmission quality reserved in accordance with a command issued by the transmission-quality reservation server 5, the content transmission terminal 4 is capable of transmitting the content to the user terminal 2 at an assured transmission quality as requested.

In accordance with the embodiment described above, in a communication network allowing a transmission quality to be reserved, on the basis of a content title and a content quality, which are specified by the user by operating the user terminal 2 as the title and quality of a desired content, the user terminal 2 computes a transmission quality of a transmission line necessary for transmitting the content from the content transmission terminal 4 to the user terminal 2, a content usage cost and a transmission-quality reservation cost. Then, on the basis of the transmission quality, the content usage cost and the transmission-quality reservation cost, the user terminal 2 and the call control server 3 automatically carry out three processes by incorporating the three processes in continuous processing. The three processes are a process to reserve a transmission quality, an accounting process for the reserved transmission quality and an accounting process for the content, the title and quality of which have been specified by the user. Thus, by merely carrying out a simple operation to specify the title and quality of a desired content on the user terminal 2, the user is capable of acquiring the content with the specified content quality assured by reserving a transmission quality computed on the basis of the specified content quality. In addition, the accounting process for the reserved transmission quality and the accounting process for the content are also completed as well. Thus, efficient processing can be carried out. As a result, a user-friendly service can be rendered to the user without requiring the user to carry out cumbersome operations.

Next, another version of the first embodiment described above is explained by referring to FIGS. 5 and 6.

FIG. 5 is a diagram showing another typical content transmission processing sequence according to the other version of the first embodiment whereas FIG. 6 is a diagram showing another typical connection request message (also referred to as an INVITE request) according to the other version of the first embodiment. The other typical content transmission processing sequence shown in FIG. 5 as a sequence according to the other version of the first embodiment is different from the sequence shown in FIG. 3 in that, in the case of the sequence shown in FIG. 5, in place of the user terminal 2, it is the call control server 3 that computes a transmission quality, a content usage cost and a transmission-quality reservation cost.

For this reason, in this other version of the first embodiment, the user terminal 2 transmits a title specified by the user as the title of a desired content and a content quality specified by the user as the quality of the content to the call control server 3 through a session after the session has been established by making use of the SIP.

Processing steps carried out in the other version of the first embodiment as steps identical with their respective counterparts shown in FIG. 3 are not explained in detail in order to avoid duplications. For example, processes carried out at steps S21 to S23, S27 to S29 and S31 to S34 of the processing sequence shown in FIG. 5 are identical with processes carried out at respectively the steps S1 to S3, S7 to S9 and S10 to S13 of the processing sequence shown in FIG. 3. In addition, the connection request message shown in FIG. 6 is identical with that shown in FIG. 4.

First of all, in the same way as the process carried out at the step S1 of the processing sequence shown in FIG. 3, at a step S21, the user terminal 2 is connected to the content transmission terminal 4 directly or by way of the NGN 1, which is an IP-based network, and issues a request to review a list of contents through a web browser. Receiving the request from the user terminal 2, at the next step S22, the content transmission terminal 4 transmits the requested list of contents to the user terminal 2.

Then, at the next step S23, the user specifies the title and quality of a content, the transmission of which is desired by the user, by selecting the content from the content list received by the user terminal 2 from the content transmission terminal 4.

Subsequently, at the next step S24, the user terminal 2 issues a request for a connection (or a request to transmit an outgoing call) in accordance with the SIP to the call control server 3. When making the request for a connection, the user terminal 2 transmits a connection request message (also referred to as an INVITE request) like one shown in FIG. 6 to the call control server 3. Then, at the next step S25, the user terminal 2 also transmits the title and quality of the desired content to the call control server 3 as a part of the request for a connection. The title and quality of the desired content can also be included in the connection request message shown in FIG. 6 or transmitted to the call control server 3 as another message.

Receiving the request for a connection from the user terminal 2, at the next step S26, the call control server 3 computes a transmission quality, a content usage cost and a transmission-quality reservation cost on the basis of the title and quality of the desired content. Then, the call control server 3 may transmit the transmission quality, the content usage cost and the transmission-quality reservation cost to the user terminal 2 to be displayed on a display unit so that the user can verify them.

Then, at the next step S27, the call control server 3 makes a reservation for the computed transmission quality in conjunction with the transmission-quality reservation server 5 on the basis of the transmission quality. In making the reservation, the transmission-quality reservation server 5 issues a command to secure the reserved transmission quality to the transmission facility in the NGN 1.

Then, at the next step S28, the call control server 3 issues a transmission-quality accounting request to the transmission-quality accounting server 6 in order to request the transmission-quality accounting server 6 to carry out an accounting process for the reserved transmission quality. At this request, the transmission-quality accounting server 6 carries out the accounting process.

Then, at the next step S29, the call control server 3 passes on the connection request message (or the INVITE request) received from the user terminal 2 to the content transmission terminal 4. Subsequently, at the next step S30, the call control server 3 also transfers information on the content title and the content quality to the content transmission terminal 4. As described above, the information on the title and quality of the desired content can also be included in the connection request message instead of being transmitted to the content transmission terminal 4 as another message.

Receiving the connection request message from the call control server 3, at the next step S31, the content transmission terminal 4 issues a content accounting request to the content accounting server 7 in order to request the content accounting server 7 to carry out an accounting process for the content. At this request, the content accounting server 7 carries out the accounting process.

Then, at the next step S32, the content transmission terminal 4 transmits a response indicating a connection success to the call control server 3. The response indicates that a connection between the content transmission terminal 4 and the user terminal 2 has been established successfully in accordance with the connection request message (or the INVITE request) received from the call control server 3. An example of the response is a message showing a method name of '200 OK.' Then, at the next step S33, the call control server 3 passes on the response received from the content transmission terminal 4 to the user terminal 2. Receiving the response indicating a connection success from the content transmission terminal 4 through the call control server 3, the user terminal 2 transmits a message having a method name of ACK to the content transmission terminal 4 in order to indicate that a session of an SIP communication has been established.

Then, at the next step S34, the content transmission terminal 4 starts transmission of the content to the user terminal 2 through the transmission facility. Since the transmission facility has secured the transmission quality reserved in accordance with a command issued by the transmission-quality reservation server 5, the content transmission terminal 4 is capable of transmitting the content to the user terminal 2 at an assured transmission quality as requested.

In accordance with the other version described above as a version of the first embodiment, in a communication network allowing a transmission quality to be reserved, the user terminal 2 transmits a title and a quality, which are specified by the user by operating the user terminal 2 as the title and quality of a desired content, to the call control server 3 whereas, on the basis of the content title and the content quality which are received from the user terminal 2, the call control server 3 computes a transmission quality of a transmission line necessary for transmitting the desired content from the content transmission terminal 4 to the user terminal 2, a content usage cost and a transmission-quality reservation cost. Then, on the basis of the transmission quality, the content usage cost and the transmission-quality reservation cost, the call control server 3 automatically carries out three processes by incorporating the three processes in continuous processing. The three processes are a process to reserve a transmission quality, an accounting process for the reserved transmission quality and an accounting process for the content, the title and quality of which have been specified by the user. Thus, by merely carrying out a simple operation to specify the title and quality of a desired content on the user terminal 2 (which also serves as a control apparatus), the user is capable of acquiring the content with the specified content quality assured by reserving a transmission quality computed on the basis of the specified content quality. In addition, the accounting process for the reserved transmission quality and the accounting process for the content are also completed as well. Thus, efficient processing can be carried out. As a result, a user-friendly service can be rendered to the user without requiring the user to carry out cumbersome operations.

In addition, in the case of the other version of the first embodiment, it is the call control server 3 that computes a transmission quality, a content usage cost and a transmission-quality reservation cost. Thus, the processing load of the user terminal 2 decreases. As a result, even if a low-cost and not-high-performance user terminal 2 is used by the user for example, the user can yet enjoy services rendered by the content transmission system. On top of that, the other version of the first embodiment exhibits the same effects as the first embodiment described previously.

It is to be noted that, in the typical content transmission processing sequence shown in FIG. 5, the following configurations are conceivable. If the user specifies the title and quality of a desired content by entering a TEL URI with the user terminal 2, the phone number of the TEL URI is peculiar to the title and quality of a content associated with the phone number. In this case, the four lowest digits of the phone number typically represent the title and quality of a content associated with the phone number. To put it in more detail, the two upper digits of the four lowest digits typically represent the title whereas the two lower digits of the four lowest digits typically represent the quality. The following phone numbers are examples:

Tel. No. of 046-555-1111 represents content title A and content quality A.

Tel. No. of 046-555-1122 represents content title A and content quality B.

Tel. No. of 046-555-2211 represents content title B and content quality A.

Tel. No. of 046-555-2222 represents content title B and content quality B.

If the user specifies the title and quality of a desired content by entering a SIP URI, on the other hand, the character string of the SIP URI is peculiar to the title and quality of a content associated with the phone number. The following SIP URIs are examples:

A SIP URI of aaaa@xx.com represents content title A and content quality A.

A SIP URI of aabb@xx.com represents content title A and content quality B.

A SIP URI of bbaa@xx.com represents content title B and content quality A.

A SIP URI of bbbb@xx.com represents content title B and content quality B.

In addition, it is possible to provide a content transmission system in which the content transmission terminal 4 merely receives a request from the user terminal 2 as a request for transmission of a desired content to the user terminal 2 but a terminal actually transmitting the content to the user terminal 2 is not the content transmission terminal 4 itself. For such a content transmission system, there are two conceivable methods which are described briefly as follows.

In accordance with the first method, the content transmission terminal 4 serving as a representative TEL URI or representative SIP URI apparatus receives a request from the user terminal 2 as a request for transmission of a desired content to the user terminal 2 in a session for determining the title and quality of the content. Then, by making use of a REFER method of the SIP, the content transmission terminal 4 transmits the request for transmission of the content to the user terminal 2 to another TEL URI or SIP URI content transmission terminal which will actually transmit the content to the user terminal 2. Finally, the other content transmission terminal transmits the content to the user terminal 2. By the way, the REFER method of the SIP is a call transfer function.

In accordance with the second method, the content transmission terminal 4 serving as a representative TEL URI or representative SIP URI apparatus receives a request from the user terminal 2 as a request for transmission of a desired content to the user terminal 2 in a session for determining the title and quality of the content. Then, in the same session, the content transmission terminal 4 returns a TEL URI or a SIP URI as a URI indicating the title and quality of the content to the user terminal 2. Finally, after breaking the connection with the content transmission terminal 4 serving as a representative TEL URI or representative SIP URI, the user terminal 2 establishes a connection with another TEL URI or SIP URI content transmission terminal, which will actually transmit the content to the user terminal 2, in order to acquire the content.

Second Embodiment

The following description explains a second embodiment in which, in order to carry out processing to transmit a content desired by the user operating the user terminal 2 from the content transmission terminal 4 to the user terminal 2, four processes are carried out by the user terminal 2 and the call control server 3 by distributing the four processes to the user terminal 2 and the call control server 3 in accordance with a payment amount specified by the user. The four processes are (1) a process to determine a content quality in a range determined by a payment amount specified by the user as the quality of the content, (2) a process to determine and reserve a transmission quality, (3) a content accounting process and (4) a transmission-quality accounting process. In the case of the first embodiment, the user specifies the title and quality of a content desired by the user. In the case of the second embodiment, on the other hand, the user specifies the title of a content desired by the user and a payment amount representing the amount of money the user is willing to pay for the content. Otherwise, the second embodiment is identical with the first embodiment. For example, the second embodiment has the same configuration as the system configuration shown in FIG. 1.

Figure 7:
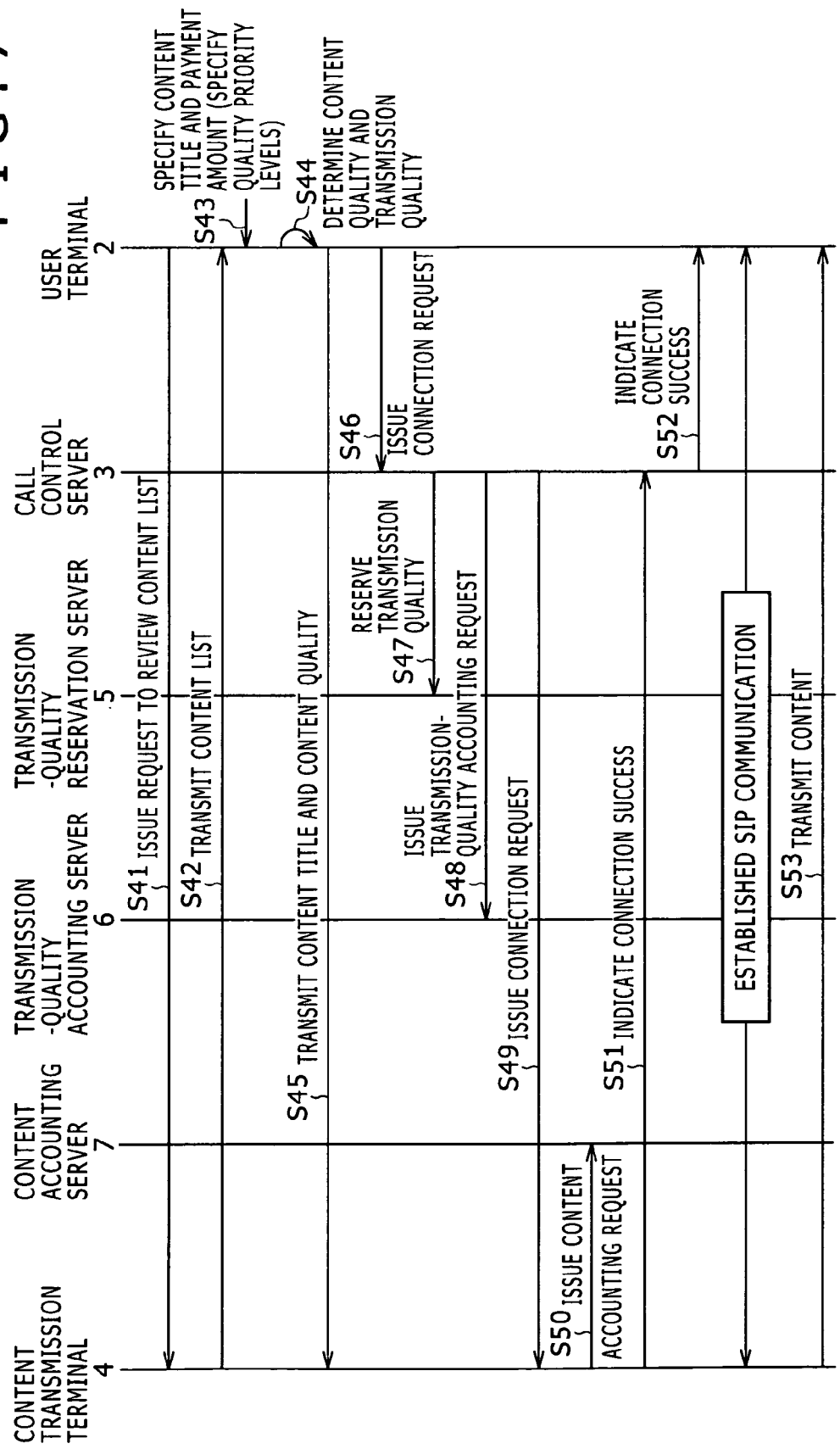
FIG. 7 is a diagram showing a typical content transmission processing sequence according to a second embodiment of the present invention.

FIG. 7 is a diagram showing a typical content transmission processing sequence according to the second embodiment in which the user terminal 2 and the call control server 3 jointly incorporate processes (1) to (4) described above in continuous processing. The flow of the basic processing is all but identical with the processing sequence shown in FIG. 3. As described above, however, in the case of the first embodiment, the user specifies the title and quality of a content desired by the user whereas, in the case of the second embodiment, the user specifies the title of a content desired by the user and a payment amount for the content. In the following description, a control apparatus means a combination of the user terminal 2 and the call control server 3. In the second embodiment, the control apparatus determines the quality of the content and a transmission quality for the content on the basis of the content title and the payment amount, which are specified by the user. It is to be noted that steps S41, S42 and S45 to S53 of the content transmission processing sequence shown in FIG. 7 are identical with respectively the steps S1, S2 and S5 to S13 of the content transmission processing sequence shown in FIG. 3.

In the processing sequence shown in FIG. 7, first of all, at a step S41, the user terminal 2 is connected to the content transmission terminal 4 directly or by way of the NGN 1, which is an IP-based network, and issues a request to review a list of contents through a web browser, that is, by making use of the http or the like. Then, at the next step S42, the content transmission terminal 4 transmits the requested list of contents to the user terminal 2.

Afterwards, at the next step S43, the user makes use of the web browser to verify the content list received by the user terminal 2 from the content transmission terminal 4. Subsequently, the user specifies the title of a content, the transmission of which is desired by the user, and a payment amount by clicking a mouse or the like. As described above, the payment amount represents the amount of money the user is willing to pay for the content. In other words, the payment amount indicates a payment ability or the like that the user has at present. At the same time as the operation to specify a payment amount, the user may also specify or set quality priority levels to be described later.

Then, at the next step S44, the user terminal 2 computes a quality of the content, the transmission of which has been requested by the user, and a transmission quality of a transmission line between the user terminal 2 and the content transmission terminal 4 on the basis of the specified content title and the specified payment amount. The transmission line is a transmission line necessary for transmitting the content from the content transmission terminal 4 to the user terminal 2. At this step, the user terminal 2 may also compute a content usage cost and a transmission-quality reservation cost. It is nice to display the content quality, the transmission quality, the content usage cost and the transmission-quality reservation cost, which have been computed by the user terminal 2, on a display unit or a monitor screen so that the user can verify them.

Then, at the next step S45, the user terminal 2 transmits information on the content title specified by the user and the content quality computed by the user terminal 2 to the content transmission terminal 4 by making use of the web browser through the http or the like, requesting the content transmission terminal 4 to transmit the content to the user terminal 2. Subsequently, at the next step S46, the user terminal 2 issues a request for a connection (or a request to transmit an outgoing call) in accordance with the SIP to the call control server 3. When issuing the request, the user terminal 2 transmits a connection request message (or an INVITE request) like the one shown in FIG. 4 to the call control server 3. The connection request message includes information on the transmission quality which is thus transmitted to the call control server 3 at the same time.

At the next step S47 after the processing carried out at the step S46, the call control server 3 makes a reservation for the transmission quality received from the user terminal 2 in conjunction with the transmission-quality reservation server 5 on the basis of the transmission quality. In making the reservation, the transmission-quality reservation server 5 issues a command to secure the reserved transmission quality to the transmission facility in the NGN 1.

Then, at the next step S48, the call control server 3 issues a transmission-quality accounting request to the transmission-quality accounting server 6 in order to request the transmission-quality accounting server 6 to carry out an accounting process for the transmission quality. At this request, the transmission-quality accounting server 6 carries out the accounting process.

Then, at the next step S49, the call control server 3 passes on the connection request message (or the INVITE request) received from the user terminal 2 to the content transmission terminal 4. The connection request message may include information on the quality of the content.

Receiving the connection request message from the call control server 3, at the next step S50, the content transmission terminal 4 issues a content accounting request to the content accounting server 7 in order to request the content accounting server 7 to carry out an accounting process for the content. At this request, the content accounting server 7 carries out the accounting process.

Then, at the next step S51, the content transmission terminal 4 transmits a response indicating a connection success to the call control server 3. The response indicates that a connection between the content transmission terminal 4 and the user terminal 2 has been established successfully in accordance with the connection request message (or the INVITE request) received from the call control server 3. An example of the response is a message showing a method name of '200 OK.' Then, at the next step S52, the call control server 3 passes on the response received from the content transmission terminal 4 to the user terminal 2. Receiving the response indicating a connection success from the content transmission terminal 4 through the call control server 3, the user terminal 2 transmits a message having a method name of ACK to the content transmission terminal 4 in order to indicate that a session of an SIP communication has been established.

Then, at the next step S53, the content transmission terminal 4 starts transmission of the content to the user terminal 2 through the transmission facility. Since the transmission facility has secured the transmission quality reserved in accordance with a command issued by the transmission-quality reservation server 5, the content transmission terminal 4 is capable of transmitting the content to the user terminal 2 at an assured transmission quality as requested.

The following description explains a method adopted in the process carried out by the user terminal 2 at the step S44 to compute a content and transmission qualities, which are each determined uniquely to a payment amount specified by the user for the content and transmission qualities. In the following description, notation $V_u$ denotes the payment amount specified by the user, notation $V_{net}$ denotes a transmission-band reservation cost, notation $V_c$ denotes a content cost, notation $k_{net}$ denotes a transmission-band reservation cost per unit transmission rate, notation $k_c$ denotes a content cost per unit transmission rate, notation $R_{net}$ denotes a transmission-band reservation rate and notation $R_c$ denotes a content transmission rate.

The transmission-band reservation cost $V_{net}$ and the content cost $V_c$ are expressed by Eqs. (1) and (2) respectively:

$$V_{net} = k_{net} * R_{net} \quad (1)$$

$$V_c = k_c * R_c \quad (2)$$

Let the transmission-band reservation rate $R_{net}$ and the content transmission rate $R_c$ be both equal to R as follows: $R_{net} = R_c = R$. In this case, in order to transmit a content with a maximum content quality in a range determined by a payment amount $V_u$ specified by the user, it is necessary to carry out optimum transmission which is transmission at a maximum transmission-band reservation rate $R_{net}$ (=R) and a maximum content transmission rate $R_c$ (=R), which satisfy Eq. (3) as follows.

$$V_u \geq V_{net} + V_c$$

$$\geq (k_c + k_{net}) * R \quad (3)$$

In the above equation, the transmission-band reservation rate $R_{net}$ and the content transmission rate $R_c$ are both equal to R. It is to be noted, however, that the transmission-band reservation rate $R_{net}$ and the content transmission rate $R_c$ can also have values different from each other. In addition, this example assumes that the higher the content transmission rate $R_c$, the better the content quality. In this typical calculation, a transmission band is taken as an example of the transmission quality. As a typical transmission quality, it is also possible to take a permissible delay, a permissible jitter quality, a band assurance priority or a combination of these qualities.

The following description explains a quality determination method in accordance with which the user is allowed to set parameters serving as weights for a transmission quality and content qualities, entering the weights to the user terminal 2. In accordance with this method, the payment amount specified by the user can be distributed to a variety of costs in accordance with set values of the parameters.

For example, let us consider a case in which (1) the image quality, (2) the resolution and (3) the frame rate are selected as content qualities.

In this case, let notation $V_u$ denote the payment amount specified by the user, notation $P_i$ denote an image-quality priority level, notation $P_f$ denote a frame-rate priority level and notation $P_r$ denote a resolution priority level. In addition, let notation $k_{net}$ denote a transmission-band reservation cost per unit transmission rate, notation $k_i$ denote a content-cost increase caused by an improved image quality as an increase per unit transmission rate, notation $k_f$ denote a content-cost increase caused by a raised frame rate as an increase per unit transmission rate, notation $k_r$ denote a content-cost increase caused by an improved resolution as an increase per unit transmission rate, notation R denote a transmission band reservation rate as well as a content transmission rate, notation $R_b$ denote a content transmission rate with all content quality parameters set at values corresponding a lowest quality, notation $R_i$ denote a transmission rate allocatable to the image quality, notation $R_f$ denote a transmission rate allocatable to the frame rate and notation $R_r$ denote a transmission rate allocatable to the resolution. The higher the image-quality priority level $P_i$, the better the image quality of the content or the better the quality of the content. By the same token, the higher the frame-rate priority level $P_f$, the higher the frame rate of the content or the better the quality of the content. In the same way, the higher the resolution priority level $P_r$, the higher the resolution of the content or the better the quality of the content. The rate R denoting the transmission band reservation rate as well as the content transmission rate is also referred to as a unit transmission rate.

The unit transmission rate R representing the transmission band reservation rate as well as the content transmission rate is expressed by Eq. (4) as follows.

$$R = R_b + R_i + R_f + R_r \quad (4)$$

As described above, the image-quality transmission rate $R_i$, the frame-rate transmission rate $R_f$ and the resolution transmission rate $R_r$ in Eq. (4) are proportional to the image-quality priority level $P_i$, the frame-rate priority level $P_f$ and the resolution priority level $P_r$ respectively in accordance with Eq. (5) as follows.

$$R_i : R_f : R_r = P_i : P_f : P_r \quad (5)$$

Thus, in order to transmit the content at quality priority levels within a range determined by the payment amount $V_u$ specified by the user, it is necessary to determine an image-quality transmission rate $R_i$, a frame-rate transmission rate $R_f$ and a resolution transmission rate $R_r$ which satisfy Eqs. (4), (5) and (6). In this way, content qualities represented by the image-quality transmission rate $R_i$, the frame-rate transmission rate $R_f$ and the resolution transmission rate $R_r$ can be distributed in a proportional manner to respectively the image-quality priority level $P_i$, the frame-rate priority level $P_f$ and the resolution priority level $P_r$ which are parameters set by the user.

$$V_u > R^* k_{net} + R_i^* k_i + R_f^* k_f + R_r^* k_r \quad (6)$$

As an example, let us consider a case in which the image-quality priority level $P_i$ is set at 2, the frame-rate priority level $P_f$ is set at 1, the resolution priority level $P_r$ is set at 1, the unit transmission rate R is 5 Mbps and the content transmission rate $R_b$ of the lowest quality is 3 Mbps. In this case, in accordance with Eq. (4), the remaining transmission rate ($R_i + R_f + R_r = R - R_b$) is 5−3=2 Mbps. The remaining transmission rate of 2 Mbps is apportioned to the image-quality transmission rate $R_i$, the frame-rate transmission rate $R_f$ and the resolution transmission rate $R_r$ which are proportional to the image-quality priority level $P_i$, the frame-rate priority level $P_f$ and the resolution priority level $P_r$ respectively in accordance with Eq. (5). That is to say, the image-quality transmission rate $R_i$, the frame-rate transmission rate $R_f$ and the resolution transmission rate $R_r$ are found to be respectively 1 Mbps, 0.5 Mbps and 0.5 Mbps which are distributed to the image-quality priority level $P_i$, the frame-rate priority level $P_f$ and the resolution priority level $P_r$ respectively.

In addition, if the quality priority levels are not set, the control apparatus is capable of analyzing the characteristic of a content desired by the user in order to determine the quality priority levels (or the quality levels) of the content qualities and the transmission quality. The following is conceivable examples. In the case of an image with strenuous movements or an image with big changes between frames, the quality priority level of the frame rate used as a content quality is set at a high value. In the case of a content requiring interactive communications like phone conversations, the transmission delay priority level is set at a high value. In the case of a high-resolution video with slow object movements, the resolution parameter is set at a high value.

Alternatively, the user operates the user terminal 2 in order to directly set the process to determine the quality priority levels (or the quality levels) of the content qualities and the transmission quality by analyzing the characteristic of a content desired by the user. In addition, it is also possible to conceive a method for directly analyzing the characteristic of a content desired by the user from the image of the content. On top of that, the quality priority levels can also be determined on the basis of metadata of the content.

In accordance with this embodiment, in a communication network allowing a transmission quality to be reserved, the user terminal 2 computes a quality of a content with transmission thereof requested by the user, a transmission quality of a transmission line necessary for transmission of the content from the content transmission terminal 4 to the user terminal 2, a content usage cost and a transmission-quality reservation cost on the basis of a content title and a payment amount, which are specified by the user. Then, on the basis of the quality of the content, the transmission quality, the content usage cost and the transmission-quality reservation cost, the user terminal 2 and the call control server 3 automatically incorporate three processes, i.e., a process to reserve the transmission quality, an accounting process for the reserved transmission quality and an accounting process for the content in continuous processing. Thus, by merely carrying out a simple operation to specify the title of a desired content and a payment amount for the content on the user terminal 2 (which serves as a control apparatus), the user is capable of acquiring the content with a quality assured by reserving an optimum transmission quality computed on the basis of the specified payment amount. In addition, the accounting process for the reserved transmission quality and the accounting process for the content are also completed as well. Thus, efficient processing can be carried out. As a result, a user-friendly service can be rendered to the user without requiring the user to carry out cumbersome operations.

In addition, if the user is also allowed to specify quality priority levels of content qualities and the transmission quality, the user can acquire a content having a high quality for each of desired content qualities each found on the basis of one of the quality priority levels, which are each specified for one of the content qualities, as a content quality in a range determined by the specified payment amount. In addition, the user can have the content transmitted from the content transmission terminal 4 to the user terminal 2 at a desired transmission quality found on the basis of the quality priority level, which is specified for the transmission quality, as a transmission quality also in the range determined by the specified payment amount.

On top of that, if the control apparatus is capable of automatically analyzing the characteristic of a content desired by the user in order to determine the quality priority levels of content qualities and the transmission quality, the user does not need to set the quality priority levels. Thus, a user-friendly service can be rendered to the user without requiring the user to carry out cumbersome operations. As a result, the second embodiment exhibits the same effects as the first embodiment described previously.

Next, another version of the second embodiment is explained by referring to FIG. 8.

FIG. 8 is a diagram showing another typical content transmission processing sequence according to the other version of the second embodiment. The other typical content transmission processing sequence shown in FIG. 8 as a sequence according to the other version of the second embodiment is different from the sequence shown in FIG. 7 in that, in the case of the sequence shown in FIG. 8, in place of the user terminal 2, it is the call control server 3 that computes a content quality, a transmission quality, a content usage cost and a transmission-quality reservation cost. For this reason, in this other version of the second embodiment, the user terminal 2 transmits a title specified by the user as the title of a desired content and a payment amount specified by the user as a payment amount of the content to the call control server 3 through a session after the session has been established by making use of the SIP. Then, by making use of the same session, the call control server 3 transmits the title of the content and a content quality obtained as a result of computation to the content transmission terminal 4.

Processing steps carried out in the other version of the second embodiment as steps identical with their respective counterparts shown in FIG. 7 are not explained in detail in order to avoid duplications. For example, processes carried out at steps S61 to S63, S67 to S69 and S71 to S74 of the processing sequence shown in FIG. 8 are identical with processes carried out at respectively the steps S41 to S43, S47 to S49 and S50 to S53 of the processing sequence shown in FIG. 7.

In the processing sequence shown in FIG. 8, first of all, much like the step S41 of the processing sequence shown in FIG. 7, at a step S61, the user terminal 2 is connected to the content transmission terminal 4 directly or by way of the NGN 1, which is an IP-based network, and issues a request to review a list of contents through a web browser. Then, at the next step S62, the content transmission terminal 4 transmits the requested list of contents to the user terminal 2.

Then, at the next step S63, the user makes use of the web browser to verify the content list received by the user terminal 2 from the content transmission terminal 4. Subsequently, the user specifies the title of a content, the transmission of which is desired by the user, and a payment amount by clicking a mouse or the like. As described above, the payment amount represents the amount of money the user is willing to pay for the content. In other words, the payment amount indicates a payment ability or the like that the user has at present. At the same time as the operation to specify a payment amount, the user may also specify or set the quality priority levels described later.

Subsequently, at the next step S64, the user terminal 2 issues a request for a connection (or a request to transmit an outgoing call) in accordance with the SIP to the call control server 3. When making the request for a connection, the user terminal 2 transmits a connection request message (also referred to as an INVITE request) like the one shown in FIG. 6 to the call control server 3. Then, at the next step S65, the user terminal 2 also transmits the title of the desired content and the payment amount for the content to the call control server 3 as a part of the request for a connection. The title of the desired content and the payment amount for the content can also be included in the connection request message shown in FIG. 6 or transmitted to the call control server 3 as another message.

Receiving the request for a connection from the user terminal 2, at the next step S66, the call control server 3 computes a content quality of a content, the transmission of which is desired by the user, and a transmission quality of a transmission line necessary for transmitting the content from the content transmission terminal 4 to the user terminal 2 on the basis of the title of the desired content and the payment amount for the content. In addition, the call control server 3 may also compute a content usage cost and a transmission-quality reservation cost. Then, the call control server 3 transmits the content quality, the transmission quality, the content usage cost and the transmission-quality reservation cost to the user terminal 2 to be displayed on a display unit so that the user can verify them.

Subsequently, at the next step S67, the call control server 3 makes a reservation for the computed transmission quality in conjunction with the transmission-quality reservation server 5 on the basis of the transmission quality. In making the reservation, the transmission-quality reservation server 5 issues a command to secure the reserved transmission quality to the transmission facility in the NGN 1.

Then, at the next step S68, the call control server 3 issues a transmission-quality accounting request to the transmission-quality accounting server 6 in order to request the transmission-quality accounting server 6 to carry out an accounting process for the transmission quality. At this request, the transmission-quality accounting server 6 carries out the accounting process.

Then, at the next step S69, the call control server 3 transfers the connection request message (or the INVITE request) received from the user terminal 2 to the content transmission terminal 4. Subsequently, at the next step S70, the call control server 3 also transfers information on the content title and the content quality to the content transmission terminal 4. The information on title and quality of the desired content can also be included in the connection request message instead of being transmitted to the content transmission terminal 4 as another message.

Receiving the connection request message from the call control server 3, at the next step S71, the content transmission terminal 4 issues a content accounting request to the content accounting server 7 in order to request the content accounting server 7 to carry out an accounting process for the content. At this request, the content accounting server 7 carries out the accounting process.

Then, at the next step S72, the content transmission terminal 4 transmits a response indicating a connection success to the call control server 3. The response indicates that a connection between the content transmission terminal 4 and the user terminal 2 has been established successfully in accordance with the connection request message (or the INVITE request) received from the call control server 3. An example of the response is a message showing a method name of "200 OK." Then, at the next step S73, the call control server 3 passes on the response received from the content transmission terminal 4 to the user terminal 2. Receiving the response indicating a connection success from the content transmission terminal 4 through the call control server 3, the user terminal 2 transmits a message having a method name of ACK to the content transmission terminal 4 in order to indicate that a session of an SIP communication has been established.

Then, at the next step S74, the content transmission terminal 4 starts transmission of the content to the user terminal 2 through the transmission facility. Since the transmission facility has secured the transmission quality reserved in accordance with a command issued by the transmission-quality reservation server 5, the content transmission terminal 4 is capable of transmitting the content to the user terminal 2 at an assured transmission quality as requested.

In accordance with the other version of the second embodiment, in a communication network allowing a transmission quality to be reserved, the user terminal 2 transmits the title of a content desired by the user and a payment amount for the content to the call control server 3. Then, the call control server 3 computes a quality of the content, the transmission of which is desired by the user, a transmission quality of a transmission line necessary for transmission of the content from the content transmission terminal 4 to the user terminal 2, a content usage cost and a transmission-quality reservation cost on the basis of the content title and a payment amount, which have been specified by the user. Subsequently, on the basis of the quality of the content, the transmission quality, the content usage cost and the transmission-quality reservation cost, the call control server 3 automatically incorporates three processes, i.e., a process to reserve the transmission quality, an accounting process for the reserved transmission quality and an accounting process for the content in continuous processing. Thus, by merely carrying out a simple operation to specify the title of a content desired by the user and a payment amount for the content on the user terminal 2, the user is capable of acquiring the content with optimum content qualities and a transmission quality, which are computed on the basis of the specified payment amount. In addition, the accounting process for the reserved transmission quality and the accounting process for the content are also completed as well. Thus, efficient processing can be carried out. As a result, a user-friendly service can be rendered to the user without requiring the user to carry out cumbersome operations.

In addition, since it is the call control server 3 that computes a content quality, a transmission quality, a content usage cost and a transmission-quality reservation cost, the processing load of the user terminal 2 decreases. Thus, even if a low-cost and not-high-performance user terminal 2 is used by the user for example, the user can enjoy services rendered by the content transmission system. On top of that, the other version exhibits the same effects as the embodiment described previously.

In addition, it is possible to provide a content transmission system in which the content transmission terminal 4 merely receives a request from the user terminal 2 as a request for transmission of a desired content to the user terminal 2 but a terminal other than the content transmission terminal 4 actually transmits the content to the user terminal 2. For such a content transmission system, there are two conceivable methods which have been described previously in the explanation of the first embodiment.

The following description explains embodiments allowing the quality of a content desired by the user and/or a payment amount for the content to be changed at a request made by the user by operating the user terminal 2 in the course of transmission of the content from the content transmission terminal 4 to the user terminal 2. In the case of these embodiments, the user makes a request by specifying a new quality of the content in the same way as the first embodiment as a new condition for the transmission of the content or specifies an additional payment amount representing an acceptable additional accounting amount in a way similar to the second embodiment as a new condition for the transmission of the content. The control apparatus regards either of the specified new conditions as a request for a content-quality change and carries out a process to change the quality of the content and the transmission quality for the content accordingly. Then, in the course of the present transmission, the content transmission terminal 4 starts new transmission of the same content on the basis of the new quality of the content and the new transmission quality for the content. It is to be noted that, when the user specifies an additional payment amount representing an acceptable additional accounting amount, the user is also allowed to enter quality priority levels to the user terminal 2 at the same time.

Third Embodiment

In the case of a third embodiment, four processes are carried out by the user terminal 2 and the call control server 3 by distributing the four processes to the user terminal 2 and the call control server 3 in accordance with a request made by the user by operating the user terminal 2 to change the quality of a content being transmitted from the content transmission terminal 4 to the user terminal 2 in the course of the transmission of the content. The four processes are (1) a process to determine a quality of the content, (2) a process to determine and reserve a transmission quality, (3) a content accounting process and (4) a transmission-quality accounting process. The configuration of the content transmission system according to the third embodiment and other features of the third embodiment are identical with those of the first embodiment.

FIG. 9 is a diagram showing a typical content transmission processing sequence in which the user terminal 2 and the call control server 3 incorporate processes (1) to (4) described above in continuous processing in accordance with a request made by the user by operating the user terminal 2 to change the quality of a content being transmitted from the content transmission terminal 4 to the user terminal 2 in the course of the transmission of the content. Processes carried out at steps S82, S83, S85 and S91 to S98 of the processing sequence shown in FIG. 9 are identical with processes carried out at respectively the steps S1, S2, S4 and S6 to S13 of the processing sequence shown in FIG. 3.

First of all, an SIP communication between the user terminal 2 and the content transmission terminal 4 is established in order to set a state in which the content transmission terminal 4 is capable of transmitting a content requested by the user to the user terminal 2 at a step S81. Then, at the next step S82, the user operates a web browser in order to drive the user terminal 2 to issue a request to review a content-quality list to the content transmission terminal 4. Subsequently, at the next step S83, the content transmission terminal 4 transmits the requested content-quality list to the user terminal 2. The content-quality list includes information on the quality of at least a content being transmitted by the content transmission terminal 4 to the user terminal 2.

Then, at the next step S84, the user makes use of the web browser to verify the content-quality list received by the user terminal 2 from the content transmission terminal 4. Subsequently, the user specifies a new desired quality of the content being transmitted by clicking a mouse or the like.

Then, at the next step S85, the user terminal 2 computes a transmission quality of a transmission line between the content transmission terminal 4 and the user terminal 2, a content usage cost and a transmission-quality reservation cost on the basis of the new quality specified by the user as the new quality of the content. The transmission line is a transmission line necessary for transmitting the content from the content transmission terminal 4 to the user terminal 2. It is nice to display the transmission quality, the content usage cost and the transmission-quality reservation cost, which have been computed by the user terminal 2, on a display unit or a monitor screen so that the user can verify them.

Then, at the next step S86, the user terminal 2 transmits a message of making a request to change the quality of the content to the call control server 3. In order to change the quality of the content, it is necessary to temporarily suspend the session between the content transmission terminal 4 and the user terminal 2. Thus, the message of making a request to change the quality of the content also has the function of a suspension request message referred to as a BYE request. For this reason, at the next step S87, the call control server 3 passes on the message of making a request to change the quality of the content to the content transmission terminal 4.

When the content transmission terminal 4 receives the message of making a request to change the quality of the content from the call control server 3, at the next step S88, the content transmission terminal 4 returns a response of '200 OK' meaning a suspension success to the call control server 3. Then, at the next step S89, the call control server 3 passes on the successful-suspension message to the user terminal 2. In this way, the session between the content transmission terminal 4 and the user terminal 2 is suspended temporarily.

Then, at the next step S90, the user terminal 2 transmits the new content quality specified by the user to the content transmission terminal 4 through a web browser, that is, by making use of the http or the like. Afterwards, subsequent processes are carried out in the same way as the steps S6 to S13 of the processing sequence shown in FIG. 3.

To be more specific, at the next step S91, the user terminal 2 issues a request for a connection (or a request to transmit an outgoing call) in accordance with the SIP to the call control server 3. The request for a connection is a connection request message also referred to as an INVITE request. When issuing the request, information on the transmission quality is included in the message and, thus, also transmitted to the call control server 3 at the same time.

Then, at the next step S92, the call control server 3 makes a reservation for the transmission quality received from the user terminal 2 in conjunction with the transmission-quality reservation server 5 on the basis of the transmission quality. Then, at the next step S93, the call control server 3 issues a transmission-quality accounting request to the transmission-quality accounting server 6 in order to request the transmission-quality accounting server 6 to carry out an accounting process for the transmission quality.

Then, at the next step S94, the call control server 3 transfers the connection request message (or the INVITE request) received from the user terminal 2 to the content transmission terminal 4. The connection request message may include information on the quality of the content.

Receiving the connection request message from the call control server 3, at the next step S95, the content transmission terminal 4 issues a content accounting request to the content accounting server 7 in order to request the content accounting server 7 to carry out an accounting process for the content.

Then, at the next step S96, the content transmission terminal 4 transmits a response indicating a connection success to the call control server 3. The response indicates that a connection between the content transmission terminal 4 and the user terminal 2 has been established successfully in accordance with the connection request message (or the INVITE request) received from the call control server 3. An example of the response is a message showing a method name of '200 OK.' Then, at the next step S97, the call control server 3 passes on the response received from the content transmission terminal 4 to the user terminal 2. Receiving the response indicating a connection success from the content transmission terminal 4 through the call control server 3, the user terminal 2 transmits a message having a method name of ACK to the content transmission terminal 4 in order to indicate that a session of an SIP communication has been established.

Then, at the next step S98, the content transmission terminal 4 starts transmission of the rest of the content at the changed quality to the user terminal 2 through the transmission facility. Since the transmission facility has secured the transmission quality reserved in accordance with a command issued by the transmission-quality reservation server 5 in the NGN 1, the content transmission terminal 4 is capable of transmitting the content to the user terminal 2 at an assured transmission quality according to the request made by the user to change the quality of the content.

In accordance with the third embodiment, in a communication network allowing a transmission quality to be reserved, if the user operates the user terminal 2 to change the quality of a content desired by the user in the course of transmission of the content from the content transmission terminal 4 to the user terminal 2, the transmission is halted and the rest of the content is transmitted at the changed quality. In this way, the user is allowed to easily specify a new quality of the content, the transmission of which has been once requested by the user, even after the first request for the transmission of the content. Thus, the quality of the content being transmitted and, hence, the transmission quality for the content can be modified dynamically. Accordingly, by merely carrying out a simple operation to newly specify the quality of the content being received on the user terminal 2, the user is capable of acquiring the content with the newly specified content quality assured by reserving a transmission quality computed on the basis of the newly specified content quality. In addition, the process to reserve the transmission quality, the accounting process for the reserved transmission quality and the accounting process for the content are incorporated in continuous processing. Thus, efficient processing can be carried out. As a result, a user-friendly service can be rendered to the user without requiring the user to carry out cumbersome operations. In addition, the third embodiment exhibits the same effects as the first embodiment described previously.

Fourth Embodiment

In the case of a fourth embodiment, four processes are carried out by the user terminal 2 and the call control server 3 by distributing the four processes to the user terminal 2 and the call control server 3 in accordance with a request made by the user by operating the user terminal 2 to specify an additional payment amount representing an acceptable additional accounting cost for a content being transmitted from the content transmission terminal 4 to the user terminal 2 and to change quality priority levels for the content in the course of the transmission of the content. The four processes are (1) a process to determine a quality of the content, (2) a process to determine and reserve a transmission quality, (3) a content accounting process and (4) a transmission-quality accounting process.

FIG. 10 is a diagram showing a typical content transmission processing sequence in which the user terminal 2 and the call control server 3 incorporate processes (1) to (4) described above in continuous processing in accordance with a request made by the user by operating the user terminal 2 to specify an additional payment amount representing an acceptable additional accounting cost for a content being transmitted from the content transmission terminal 4 to the user terminal 2 and to change quality priority levels for the content in the course of the transmission of the content. Processes carried out at steps S101 and S104 to S116 of the processing sequence shown in FIG. 10 are identical with processes carried out at respectively the steps S81 and S86 to S98 of the processing sequence shown in FIG. 9.

First of all, an SIP communication between the user terminal 2 and the content transmission terminal 4 is established in order to set a state in which the content transmission terminal 4 is capable of transmitting a content requested by the user to the user terminal 2 at a step S101. Then, at the next step S102, the user makes use of a web browser to verify the content being transmitted from the content transmission terminal 4 to the user terminal 2. Subsequently, the user specifies an additional payment amount representing an acceptable additional accounting cost for the content by clicking a mouse or the like.

Then, at the next step S103, the user terminal 2 recalculates the quality of the content being transmitted from the content transmission terminal 4 to the user terminal 2 and a transmission quality of a transmission line between the user terminal 2 and the content transmission terminal 4 on the basis of the additional payment amount specified by the user to represent an additional accounting cost for the content. The transmission line is a transmission line necessary for transmitting the content from the content transmission terminal 4 to the user terminal 2. The user terminal 2 may also re-compute the content usage cost and the transmission-quality reservation cost as well. It is nice to display the content quality, the transmission quality, the content usage cost and the transmission-quality reservation cost, which have been computed by the user terminal 2, on a display unit or a monitor screen so that the user can verify them.

Then, at the next step S104, the user terminal 2 transmits a message of making a request to change the quality of the content to the call control server 3. As described above, the subsequent processes carried out at steps S105 to S116 of the processing sequence shown in FIG. 10 are identical with the processes carried out at respectively the steps S87 to S98 of the processing sequence shown in FIG. 9 and the description thereof will be omitted.

Since the transmission facility has secured the transmission quality reserved in accordance with a command issued by the transmission-quality reservation server 5 in the NGN 1, the content transmission terminal 4 is capable of transmitting the content to the user terminal 2 at a transmission quality assured in accordance with the additional payment amount specified by the user to represent an additional accounting cost as requested by the user.

It is to be noted that, at the step S102 executed to specify an additional payment amount, the user may also specify (or change) quality priority levels as well. If the user specifies (or changes) quality priority levels, the technique explained in the description of the second embodiment can be adopted for determining new content and transmission qualities according to the new quality priority levels.

In accordance with the fourth embodiment, in a communication network allowing a transmission quality to be reserved, if the user operates the user terminal 2 to specify an additional payment amount representing an acceptable additional accounting cost in the course of transmission of the content from the content transmission terminal 4 to the user terminal 2, the transmission of the content at the originally computed qualities is halted and the content is retransmitted at qualities changed in accordance with the specified additional payment amount. In this way, the user is allowed to easily specify an additional payment amount even after the first request for the transmission of the content. Thus, the quality of the content being transmitted and, hence, the transmission quality for the content can be modified dynamically. Accordingly, by merely carrying out a simple operation to newly specify an additional payment amount on the user terminal 2, the user is capable of acquiring the content with a new content quality, which is assured by reserving a transmission quality computed on the basis of the newly specified additional payment amount, as a content quality within the additional payment amount. In addition, the process to reserve the transmission quality, the accounting process for the reserved transmission quality and the accounting process for the content are incorporated in continuous processing. Thus, efficient processing can be carried out. As a result, a user-friendly service can be rendered to the user without requiring the user to carry out cumbersome operations. In addition, the fourth embodiment exhibits the same effects as the second and third embodiments described previously.

Fifth Embodiment

Next, a fifth embodiment is explained by referring to FIGS. 11 and 12.

In a communication network adopting the SIP in the same way as the NGN 1, as described earlier, a phone number is associated with a communication network address and/or a service in implementing means to make an access to a desired communication partner in accordance with an ENUM technology. The fifth embodiment adopts the technology in order to make a request for a content quality and specify a payment amount by making use of a phone number and an auxiliary number appended to the phone number. In the fifth embodiment, a control apparatus, which can be the user terminal 2, the call control server 3 or the content transmission terminal 4, analyzes a phone number having an auxiliary phone number appended thereto and carries out a process to make a reservation for a transmission quality in accordance with a result of the analysis. The basic system configuration shown in FIG. 1, the content transmission processing sequences, etc, which been explained before for the first to fourth embodiments, can also be applied to the fifth embodiment.

If a content quality is specified by making use of the auxiliary number appended to a phone number for example, a typical format shown in FIG. 11 is adopted as the format of the auxiliary number and the phone number. In this typical format of the auxiliary number and the phone number, the phone number can be used to represent the title of a desired content whereas the auxiliary number following the phone number can be used to represent the image quality, resolution and frame rate of the content.

Receiving the auxiliary number and the phone number as a TEL URI, the content transmission terminal 4 analyzes the auxiliary number of the TEL URI and starts transmission of a content having a quality indicated by the auxiliary number.

Let us assume for example that the user enters a TEL URI of XXX-XXX-XXXX#123 to the user terminal 2. In this case, the content transmission terminal 4 recognizes the phone number of XXX-XXX-XXXX as the title of a content desired by the user, selecting a quality determined by an image quality parameter of 1, a resolution parameter of 2 and a frame rate parameter of 3 for the content. Then, the content transmission terminal 4 transmits the content desired by the user as a content having the quality of the types indicated by the parameters to the user terminal 2. It is to be noted that, of course, the parameters representing the types of the content quality that can be selected in accordance with the fifth embodiment are by no means limited to the image quality parameter, the resolution parameter and the frame rate parameter.

In addition, by the same token, it is also conceivable to specify information on a payment amount by making use of an auxiliary number. In this case, a typical format of the TEL URI is shown in FIG. 12. In this typical format of the TEL URI, an auxiliary number follows a phone number in the same way as the format shown in FIG. 11. By making use of the auxiliary number, it is possible to specify a payment amount per unit time of the time period for reproducing the requested content. As an alternative, the auxiliary number can be used for specifying, among other kinds of information, a payment amount per content.

The format shown in FIG. 12 as a format to specify a payment amount by making use of the auxiliary number is explained for the typical content transmission processing sequence shown in FIG. 8. In this case, it is conceivable to adopt a method for interpreting the phone number and the auxiliary number as follows. First of all, the user specifies a payment amount by making use of an auxiliary number following a phone number in the format shown in FIG. 12 as a format used to specify a payment amount. Then, the call control server 3 analyzes the auxiliary number in order to determine a content quality according to the payment amount represented by the auxiliary number. After the call control server 3 determines the content quality, the call control server 3 converts the phone number preceding the auxiliary number in the format into the title of a desired content in the same way as the interpretation of the format shown in FIG. 11 as a format used to specify qualities of a desired content. Thus, when the user operates the user terminal 2 in order to specify the phone number followed by the auxiliary number specifying the payment amount, the call control server 3 receiving the call from the user terminal 2 automatically determines a quality in a range determined in accordance with the payment amount represented by the auxiliary number as an optimum quality of the desired content, which is represented by the phone number. Then, the call control server 3 transmits information on the title of the desired content and the optimum quality of the content to the content transmission terminal 4.

In the embodiments described above, the user operates the user terminal 2 in order to directly enter pieces of information such as the title of a desired content, the quality of the desired content, a payment amount of the desired content and quality priority levels to the user terminal 2. It is to be noted, however, that the content transmission system can also be so designed that the user terminal 2 automatically creates such information. For example, the user terminal 2 and the content transmission terminal 4 may always carry out a communication by making use of the http. In this case, when the user terminal 2 determines that the content transmission terminal 4 has a content serving as a favorite with the user during the communication, the user terminal 2 automatically transmits a request to the content transmission terminal 4 as a request for transmission of the content from the content transmission terminal 4 to the user terminal 2. In this way, the user is capable of acquiring the content with a desired content quality, which is assured by reserving a transmission quality computed by the user terminal 2 or the call control server 3 on the basis of the created information. In the case of such a content transmission system, it is nice to predetermine whether the request for transmission of a content from the content transmission terminal 4 to the user terminal 2 is issued by the user terminal 2 to the content transmission terminal 4 by making use of the http or the SIP.

In addition, it should be understood by those skilled in the art that a variety of modifications, combinations, sub-combinations and alterations may occur, depending on design requirements and other factors as far as they are within the scope of the appended claims or the equivalents thereof.

What is claimed is:

1. A control apparatus for accepting a request for transmission of a content from a content transmission apparatus to said control apparatus and for passing on said request to said content transmission apparatus for transmitting said content to said control apparatus by way of a communication network allowing a transmission quality to be reserved and for issuing a request to a content accounting server having a function to carry out a content accounting process according to a substance and content quality of a content as a request for execution of a content accounting process for said content wherein said control apparatus:

receives a specified substance of a content and a specified content quality of said content and transmits a request based on said specified substance and said specified content quality to said content transmission apparatus as a request for transmission of said content from said content transmission apparatus to said control apparatus;

determines a transmission quality on the basis of said specified content quality and makes a reservation for said determined transmission quality of a transmission line between said content transmission apparatus and said control apparatus in conjunction with a transmission-quality reservation server, which is connected to said communication network, on the basis of said transmission quality; and issues a request to a transmission-quality accounting server having a function to carry out an accounting process according to a transmission quality as a request for execution of an accounting process for said reserved transmission quality, wherein, when the user operates said control apparatus to change said specified content quality used as a basis for said request transmitted to said content transmission apparatus as a request for transmission of said content from said content transmission apparatus to said control apparatus to a new content quality, after said control apparatus stops said transmission of said content at said specified content quality before being changed from said content transmission apparatus to said control apparatus, said control apparatus:

retransmits a request to said content transmission apparatus as a request for retransmission of said content based on said new content quality from said content transmission apparatus to said control apparatus;

determines a new transmission quality on the basis of said new content quality;

makes a reservation for said determined new transmission quality of said transmission line between said content transmission apparatus and said control apparatus in conjunction with said transmission-quality reservation server on the basis of said transmission quality; and issues a request to said transmission-quality accounting server as a request for execution of an accounting process for said reserved new transmission quality, said request for execution of an accounting process for said reserved new transmission quality being separate and distinct from said request for retransmission of said content based on said new content quality, such that said request for execution of an accounting process for said reserved new transmission quality does not include said request for retransmission of said content based on said new content quality, wherein based on a content title and a content quality specified by a user operating the control apparatus as the title and quality of a desired content, the control apparatus computes a transmission quality of a transmission line necessary for transmitting the desired content from the content transmission apparatus to the control apparatus, a content usage cost and a transmission-quality reservation cost, and transmits the content usage cost and transmission-quality reservation cost to a display unit, and wherein based on the transmission quality, the content usage cost, and the transmission-quality reservation cost, the control apparatus and a call control server automatically carry out a process to reserve a transmission quality, an accounting process for the reserved transmission quality, and an accounting process for the content, wherein specifying the content title and content quality includes (i) the user indicating a phone number and an appended auxiliary number, the phone number representing the content title, and the auxiliary number representing a payment amount parameter, and (ii) the call control server determining a content quality according to the payment amount parameter.

2. The control apparatus according to claim 1 wherein:

functions of said control apparatus are distributed to a terminal apparatus to be operated by said user to specify said substance of said content as well as said content quality of said content and a call control server configured to carry out a process to establish a session between said terminal apparatus and said content transmission apparatus in said communication network;

said terminal apparatus issues a request based on said specified substance and said specified content quality to said content transmission apparatus as a request for transmission of said content from said content transmission apparatus to said terminal apparatus, determines a transmission quality of a transmission line between said content transmission apparatus and said terminal apparatus on the basis of said specified content quality and transmits said determined transmission quality to said call control server; and said call control server makes a reservation for said determined transmission quality received from said terminal apparatus in conjunction with said transmission-quality reservation server on the basis of said transmission quality and issues a request to said transmission-quality accounting server as a request for execution of an accounting process for said reserved transmission quality.

3. The control apparatus according to claim 1 wherein:

functions of said control apparatus are distributed to a terminal apparatus to be operated by said user to specify said substance of said content as well as said content quality of said content and a call control server configured to carry out a process to establish a session between said terminal apparatus and said content transmission apparatus in said communication network;

said terminal apparatus issues a request to said call control server as a request to establish a session between said terminal apparatus and said content transmission apparatus in said communication network, transmitting said specified substance and said specified content quality to said call control server; and said call control server determines a transmission quality of a transmission line between said content transmission apparatus and said terminal apparatus on the basis of said specified content quality received from said terminal apparatus, makes a reservation for said determined transmission quality in conjunction with said transmission-quality reservation server on the basis of said transmission quality and issues a request to said transmission-quality accounting server as a request for execution of an accounting process for said reserved transmission quality.

4. The control apparatus according to claim 2 wherein said communication network is a Next-Generation Network making use of an Internet Protocol which is adopted by said call control server in said process to establish a session between said terminal apparatus and said content transmission apparatus making use of a Session Initiation Protocol.

5. The control apparatus according to claim 4 wherein said user specifies said substance of said content and said content quality of said content by making use of a phone number and an auxiliary number respectively.

6. A content transmission system comprising:
a content transmission apparatus to transmit a content requested by a content request originator to said content request originator by way of a communication network allowing a transmission quality to be reserved and to issue a request to a content accounting server having a function to carry out a content accounting process according to the substance and content quality of a content as a request for execution of a content accounting process for said requested content; and a call control server configured to carry out a process to establish a session between said content request originator and said content transmission apparatus, to make a reservation for a transmission quality of a transmission line between said content transmission apparatus and said content request originator in conjunction with a transmission-quality reservation server having a function to make a reservation for a transmission quality jointly with said call control server and to issue a request to a transmission-quality accounting server having a function to carry out an accounting process according to a transmission quality as a request for execution of an accounting process for said reserved transmission quality, wherein said call control server
makes a reservation for a transmission quality of said transmission line on the basis of a transmission quality determined properly by said call control server or a user terminal for the said content quality of said content requested by said content request originator, and issues a request to said transmission-quality accounting server as a request for execution of an accounting process for said reserved transmission quality, wherein, when the user operates said control apparatus to change said specified content quality used as a basis for said request transmitted to said content transmission apparatus as a request for transmission of said content from said content transmission apparatus to said control apparatus to a new content quality, after said control apparatus stops said transmission of said content at said specified content quality before being changed from said content transmission apparatus to said control apparatus, said control apparatus:

retransmits a request to said content transmission apparatus as a request for retransmission of said content based on said new content quality from said content transmission apparatus to said control apparatus;

determines a new transmission quality on the basis of said new content quality;

makes a reservation for said determined new transmission quality of said transmission line between said content transmission apparatus and said control apparatus in conjunction with said transmission-quality reservation server on the basis of said transmission quality; and issues a request to said transmission-quality accounting server as a request for execution of an accounting process for said reserved new transmission quality, said request for execution of an accounting process for said reserved new transmission quality being separate and distinct from said request for retransmission of said content based on said new content quality, such that said request for execution of an accounting process for said reserved new transmission quality does not include said request for retransmission of said content based on said new content quality, wherein based on a content title and a content quality specified by a user operating the control apparatus as the title and quality of a desired content, the control apparatus computes a transmission quality of a transmission line necessary for transmitting the desired content from the content transmission apparatus to the control apparatus, a content usage cost and a transmission-quality reservation cost, and transmits the content usage cost and transmission-quality reservation cost to a display unit, and wherein based on the transmission quality, the content usage cost, and the transmission-quality reservation cost, the control apparatus and a call control server automatically carry out a process to reserve a transmission quality, an accounting process for the reserved transmission quality, and an accounting process for the content, wherein specifying the content title and content quality includes (i) the user indicating a phone number and an appended auxiliary number, the phone number representing the content title, and the auxiliary number representing a payment amount parameter, and (ii) the call control server determining a content quality according to the payment amount parameter.

7. A content transmission method for transmitting a content requested by a content request originator to said content request originator by way of a communication network allowing a transmission quality to be reserved from a content transmission apparatus also used for issuing a request to a content accounting server having a function to carry out a content accounting process according to a substance and content quality of a content as a request for execution of a content accounting process for said requested content, said content transmission method comprising the steps of:

a control apparatus, which is operated by said content request originator in order to specify the substance and quality of said requested content, issuing a request based on said specified substance and specified quality of said requested content to said content transmission apparatus as a request for transmission of said requested content from said content transmission apparatus to said control apparatus;

said control apparatus determining a transmission quality of a transmission line between said content transmission apparatus and said control apparatus on the basis of said specified content quality;

said control apparatus making a reservation for said determined transmission quality of said transmission line in conjunction with a transmission-quality reservation server, which is connected to said communication network, on the basis of said transmission quality; and said control apparatus issuing a request to a transmission-quality accounting server having a function to carry out an accounting process according to a transmission quality as a request for execution of an accounting process for said reserved transmission quality, wherein, when the user operates said control apparatus to change said specified content quality used as a basis for said request transmitted to said content transmission apparatus as a request for transmission of said content from said content transmission apparatus to said control apparatus to a new content quality, after said control apparatus stops said transmission of said content at said specified content quality before being changed from said content transmission apparatus to said control apparatus, said control apparatus:

retransmits a request to said content transmission apparatus as a request for retransmission of said content based on said new content quality from said content transmission apparatus to said control apparatus;

determines a new transmission quality on the basis of said new content quality;

makes a reservation for said determined new transmission quality of said transmission line between said content transmission apparatus and said control apparatus in conjunction with said transmission-quality reservation server on the basis of said transmission quality; and issues a request to said transmission-quality accounting server as a request for execution of an accounting process for said reserved new transmission quality, said request for execution of an accounting process for said reserved new transmission quality being separate and distinct from said request for retransmission of said content based on said new content quality, such that said request for execution of an accounting process for said reserved new transmission quality does not include said request for retransmission of said content based on said new content quality, wherein based on a content title and a content quality specified by a user operating the control apparatus as the title and quality of a desired content, the control apparatus computes a transmission quality of a transmission line necessary for transmitting the desired content from the content transmission apparatus to the control apparatus, a content usage cost and a transmission-quality reservation cost, and transmits the content usage cost and transmission-quality reservation cost to a display unit, and wherein based on the transmission quality, the content usage cost, and the transmission-quality reservation cost, the control apparatus and a call control server automatically carry out a process to reserve a transmission quality, an accounting process for the reserved transmission quality, and an accounting process for the content, wherein specifying the content title and content quality includes (i) the user indicating a phone number and an appended auxiliary number, the phone number representing the content title, and the auxiliary number representing a payment amount parameter, and (ii) the call control server determining a content quality according to the payment amount parameter.

* * * * *